(12) United States Patent
Babu et al.

(10) Patent No.: US 11,872,767 B2
(45) Date of Patent: Jan. 16, 2024

(54) ADDITIVE MANUFACTURING

(71) Applicant: Alloyed Limited, Yarnton (GB)

(72) Inventors: Sarat Babu, London (GB); Jovan Djordje Stojsavljevic, Hove (GB); Matthew James Longbottom, London (GB)

(73) Assignee: Alloyed Limited, Yarnton (GB)

(*) Notice: Subject to any disclaimer, the term of this patent is extended or adjusted under 35 U.S.C. 154(b) by 276 days.

(21) Appl. No.: 16/466,545

(22) PCT Filed: Dec. 8, 2017

(86) PCT No.: PCT/GB2017/053695
§ 371 (c)(1),
(2) Date: Jun. 4, 2019

(87) PCT Pub. No.: WO2018/104748
PCT Pub. Date: Jun. 14, 2018

(65) Prior Publication Data
US 2019/0315067 A1 Oct. 17, 2019

(30) Foreign Application Priority Data
Dec. 8, 2016 (GB) .................................... 1620854

(51) Int. Cl.
*B29C 64/393* (2017.01)
*G05B 19/4099* (2006.01)
*B33Y 50/02* (2015.01)

(52) U.S. Cl.
CPC ........ *B29C 64/393* (2017.08); *G05B 19/4099* (2013.01); *B33Y 50/02* (2014.12)

(58) Field of Classification Search
CPC . B29C 64/393; B29C 64/386; G05B 19/4099; B33Y 50/02; B33Y 50/00
See application file for complete search history.

(56) References Cited

U.S. PATENT DOCUMENTS 8,983,646 B1 3/2015 Hanna
2003/0045965 A1 3/2003 Sinn
(Continued)

FOREIGN PATENT DOCUMENTS

CN 105711102 6/2016
CN 105976362 9/2016
(Continued)

OTHER PUBLICATIONS

Mueller et al., "WirePrint: 3d Printed Preview for Fast Prototyping", In proceedings of 27$^{th}$ ACM User Interface Software and Tech, Symposium, Oct. 2014.
(Continued)

*Primary Examiner* — Ziaul Karim
(74) *Attorney, Agent, or Firm* — Diedericks & Whitelaw, PLC.

(57) ABSTRACT

Generating tool path data for use in additive manufacturing comprises providing object design data in which at least part of the object is represented abstractly using lines and/or surfaces. The lines and/or surfaces can then be used to provide tool path data for the build layers of an additive manufacturing apparatus. The tool paths can be reconfigured to reduce the overall distance travelled and/or travel time when the additive manufacturing apparatus implements the tool path data. An additive manufacturing parameter for a structural feature of the object can also be selected based on the geometry of the structural feature and specified in the tool path data.

18 Claims, 16 Drawing Sheets

(56) References Cited

U.S. PATENT DOCUMENTS

| | | | |
|---|---|---|---|
| 2014/0052285 A1 | 2/2014 | Butcher et al. | |
| 2015/0035198 A1 | 2/2015 | Saba | |
| 2015/0079327 A1 | 3/2015 | Kautz et al. | |
| 2015/0130114 A1 | 5/2015 | Joyce | |
| 2015/0224710 A1* | 8/2015 | El-Siblani | B33Y 10/00 264/401 |
| 2015/0251356 A1* | 9/2015 | Batchelder | B33Y 50/02 700/98 |
| 2016/0059493 A1* | 3/2016 | Sparks | B22F 10/80 700/98 |
| 2016/0074937 A1* | 3/2016 | Nassar | B29C 64/153 419/53 |
| 2016/0167311 A1* | 6/2016 | Schmidt | H05K 1/18 700/98 |
| 2016/0185045 A1* | 6/2016 | Linnell | B29C 64/393 264/401 |
| 2016/0209820 A1* | 7/2016 | Banadyga | B29C 64/386 |
| 2016/0266572 A1* | 9/2016 | Chang | B33Y 50/02 |
| 2017/0239719 A1* | 8/2017 | Buller | B22F 3/1055 |

FOREIGN PATENT DOCUMENTS

| | | |
|---|---|---|
| WO | 89/10256 | 11/1989 |
| WO | 96/12608 | 5/1996 |
| WO | 2011/011818 | 2/2011 |
| WO | 2015/140604 | 9/2015 |
| WO | 2016/030883 | 3/2016 |
| WO | 2016/081496 | 5/2016 |

OTHER PUBLICATIONS

Wikipedia, "STL (file format)", published Dec. 7, 2016. https://en.wikipedia.org/w/index.php?title=/STL_(file_format)&oldid=753510333.

Wikipedia, "Travelling salesman problem", published Nov. 28, 2016. https://en.wikipedia.org/w/index.php?title=Travelling_salesman_problem&oldid=751894771.

Yu-Xin et al., "An Optimized Scheme to Generating Support Structure for 3D Printing", ICIG 2015: Image & Graphics, pp. 571-578, 2015.

\* cited by examiner

Fig. 4
1. Intended Geometry
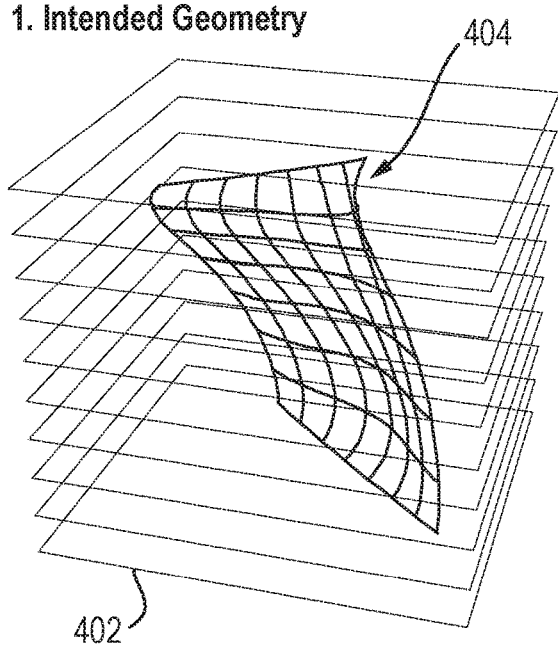
2. Move Edge Nodes to Nearest Layer
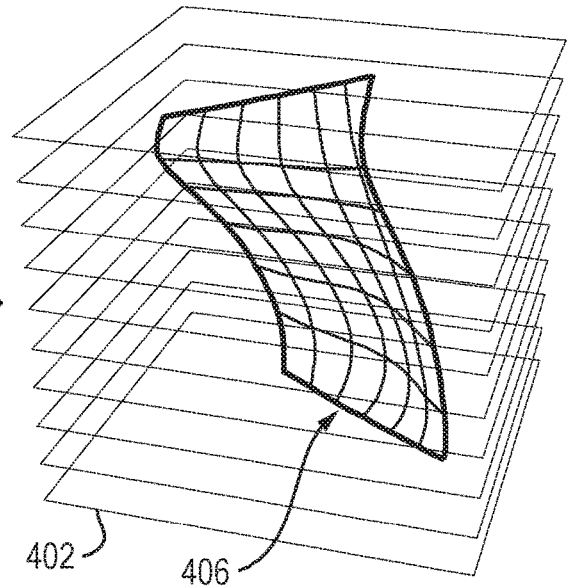
3. Slice Geometry to Create layer lines
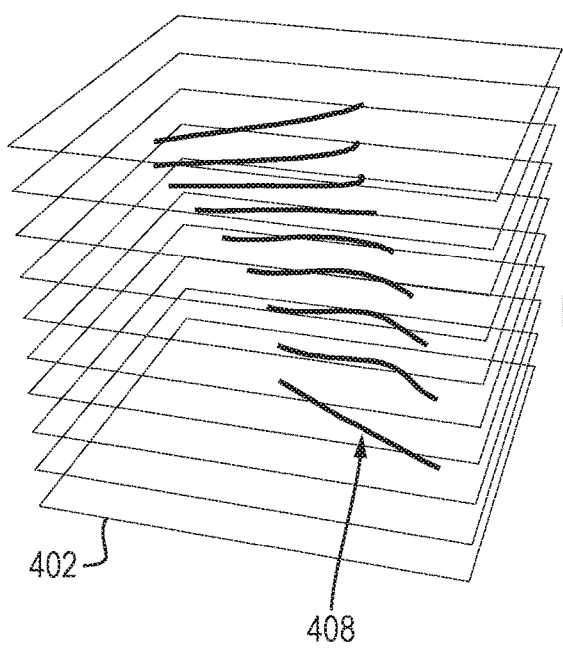
4. Project layer lines and interpolate additional toolpaths
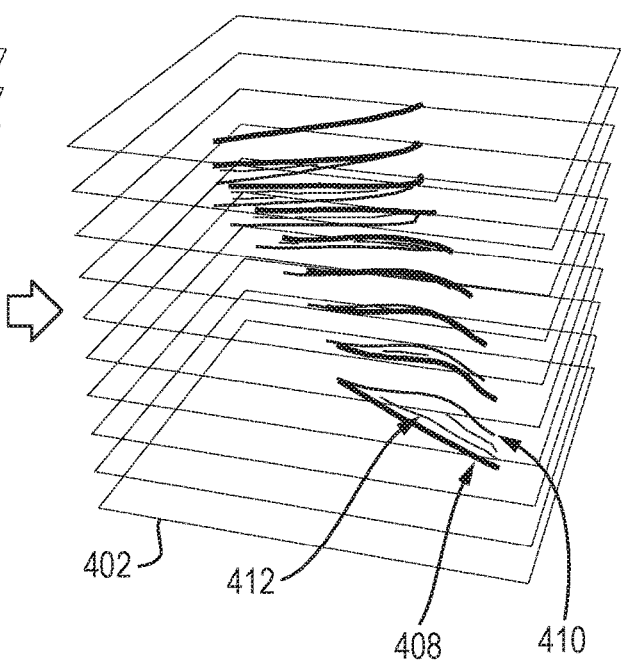

Fig. 8
1. Filling of Geometry with points via a 2D Poisson Disk
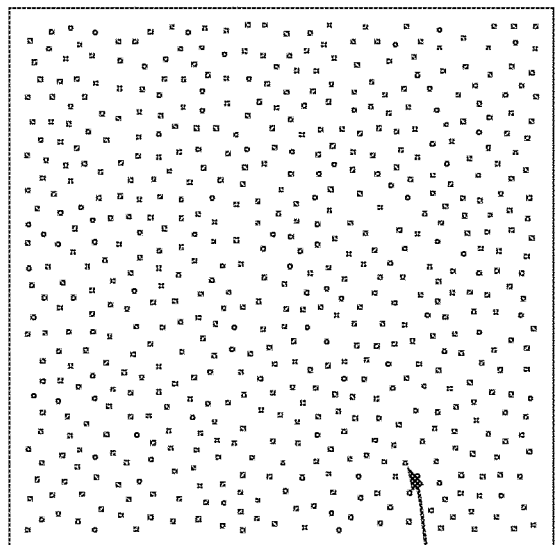
2. Connect points with a single path
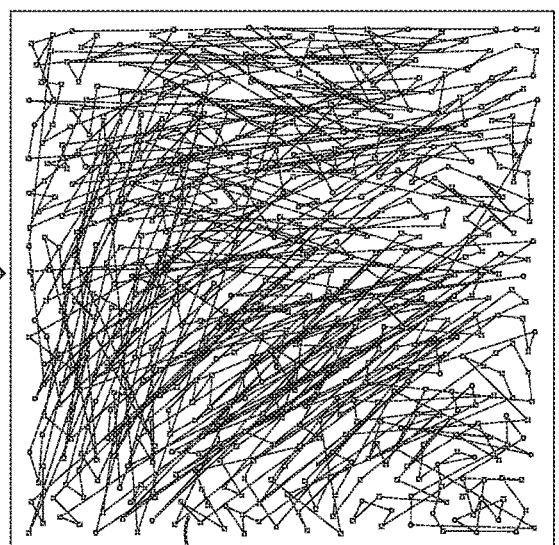
3. Sorting of path
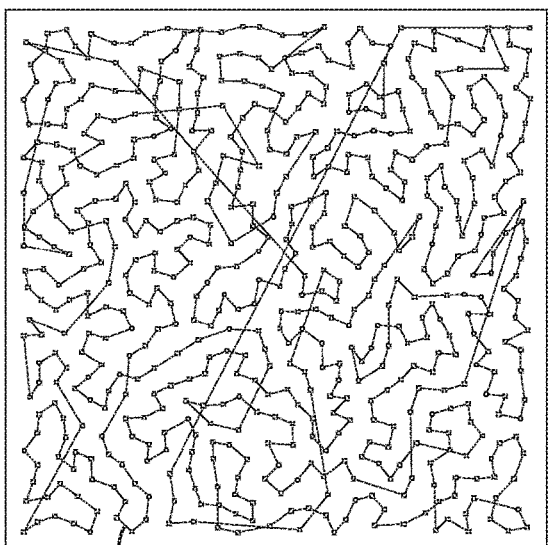
4. Splitting of Path to remove overlaps
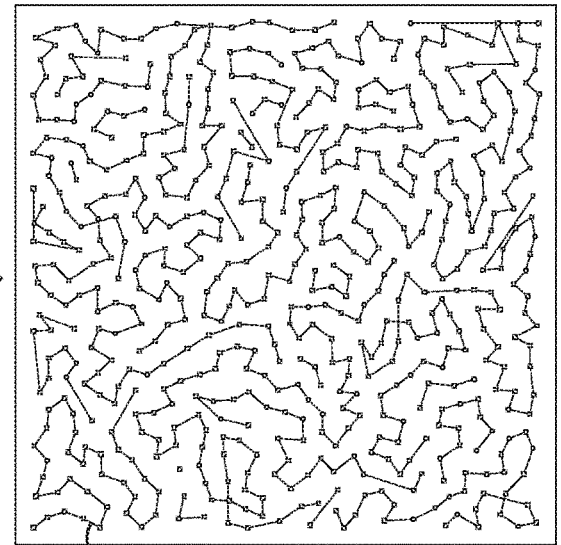

ADDITIVE MANUFACTURING

CROSS-REFERENCE TO RELATED APPLICATIONS

This application represents the U.S. National Phase of International Application number PCT/GB2017/053695 entitled "Additive Manufacturing" filed 8 Dec. 2017, which claims priority from Great Britain Patent Application number 1620854.8 filed 8 Dec. 2016.

FIELD OF THE INVENTION

The present invention relates to generating tool path data for use in additive manufacturing.

BACKGROUND

Additive manufacturing (e.g. 3D printing) is often carried out by selective deposition or solidification of material. The selective deposition or solidification of material is often carried out in plural build layers within a 3D space. The build layers can be 2D planes or 3D surfaces. In these arrangements, the design data for an object to be manufactured is typically provided in a volumetric representation, such as STL (STereoLithography), and is then divided into slices that correspond to the build layers of the additive manufacturing apparatus in question. The slices are typically defined by closed contours. Tool path data that comprises points or lines, for example in a raster pattern, is then generated for each build layer in order to fill the areas within the closed contours. The tool path data for each build layer is then followed by the tool (e.g. laser) of the additive manufacturing apparatus so as to selectively deposit or solidify material so as to manufacture the object. This typically comprises moving the point of deposition or solidification of material along one or more tool paths. The deposition or solidification is typically either modulated from point to point along the one or more tool paths (e.g. a laser is operated at a particular point, then switched off, then moved to the next point, and then operated again) or is continuous along each of the one or more tool paths (e.g. a laser is continuously operated along each tool path).

Additive manufacturing has the advantage of being able to produce a variety of different physical objects using the same manufacturing apparatus but with different tool path data. Additive manufacturing also has the advantage of being able to produce complex objects that are extremely difficult, or in some cases impossible, to produce when using more established manufacture processes, such as subtractive, forming or casting processes. There is accordingly a strong desire for additive manufacturing to produce physical objects having similar, or in some cases better, material and/or structural properties when compared with more established manufacture processes.

However, the existing processes for generating tool path data for additive manufacturing are often extremely computationally intensive, particularly for objects having complex structural features. Furthermore, the existing processes of generating tool path data for additive manufacturing often fail to utilise the full resolution of the additive manufacturing apparatus in question. Furthermore, the existing processes of generating tool path data for additive manufacturing often produce tool path data that is time consuming for the additive manufacturing apparatus to implement and that produces physical objects having inferior material and/or structural properties when compared with more established manufacture processes.

The Applicants accordingly believe that there remains scope for improvements in generating tool path data for use in additive manufacturing.

SUMMARY

According to an aspect of the present invention, there is provided a method of generating tool path data for use in additive manufacturing, the method comprising:

providing object design data in which at least a part of the object is represented by a first layer point that lies within a first build layer and a second layer point that lies within a second build layer;

projecting the second layer point to a projected layer point that lies within the first build layer; and connecting the first layer point to the projected layer point to provide tool path data for the first build layer.

In any of the aspects or embodiments described herein, at least a part of the object may also or instead be represented by a line. These embodiments may comprise discretizing the line to generate the first layer point that lies within the first build layer and the second layer point that lies within the second build layer.

Thus, according to another aspect of the present invention, there is provided a method of generating tool path data for use in additive manufacturing, the method comprising:

providing object design data in which at least a part of the object is represented by a line;

discretizing the line to generate a first layer point that lies within a first build layer and a second layer point that lies within a second build layer;

projecting the second layer point to a projected layer point that lies within the first build layer; and connecting the first layer point to the projected layer point to provide tool path data for the first build layer.

The present invention in these aspects and their embodiments accordingly provides a way to generate tool path data from layer points and/or lines that represent the object (e.g. in an abstract and/or parametric manner), for example without generating closed contours directly from a volumetric (e.g. STL) representation of the object. This means that the process of generating the tool path data can be less computationally intensive. The resultant tool path data can also be closer to the resolution of a particular additive manufacturing apparatus to be used to make the object, both in terms of the thickness of the build layers used by that additive manufacturing apparatus and in terms of a thickness of material that can be achieved by that additive manufacturing apparatus using a single tool path line. The tool path data can also be quicker for an additive manufacturing apparatus to implement and produce objects having finer detail and/or superior material and/or structural properties, when compared with existing additive manufacturing arrangements.

Embodiments may comprise, prior to discretizing the line, moving an end node of the line to a build layer for that end node to generate an end node layer point. These embodiments may comprise moving both end nodes of the line to respective build layers for those end nodes to generate respective end node layer points. In embodiments, an end node may be moved to the nearest build layer, moved downwards to the next build layer, or moved upwards to the next build layer for that end node. In embodiments, an end node layer point may be used as the first layer point and/or an end node layer point may be used as the second layer point.

In embodiments, discretizing the line may comprise determining an intersection layer point at the intersection of the line and a build layer. In these embodiments, discretizing the line may comprise determining plural intersection layer points at the intersections of the line and respective build layers. In embodiments, an intersection layer point may be used as the first layer point and/or an intersection point may be used as the second layer point.

In embodiments, the second layer point may be projected downwards or upwards to the first build layer. The downwards direction and/or upwards direction referred to herein in any aspect or embodiment may be with respect to the order in which the additive manufacturing apparatus builds the layers of the object in use, with the additive manufacturing apparatus building the layers progressively away from the downwards direction and/or in the upwards direction.

In embodiments, the line may have a thickness specified in the object design data. In embodiments, the specified thickness may be substantially equal to a thickness of material that can be achieved by a particular additive manufacturing apparatus using a single tool path line. In embodiments, the thickness may be indicated in the tool path data. Thus, in embodiments, at least part of the object may be represented abstractly and/or parametrically by the line (e.g. with a specified thickness for the line), for example rather than volumetrically (e.g. by a net of polygons that enclose a volume, such as in STL). Thus, in embodiments, the line may not form part of a volumetric (e.g. STL) representation of the object. For example, in embodiments, a cylindrical feature of an object may be represented by a line (e.g. with a specified thickness) rather than by a net of polygons that enclose the volume of the cylindrical feature of the object.

In embodiments, the line that represents the object may be a straight line, a polyline or a curved line. In any of the aspects or embodiments described herein a polyline may be a line formed of plural lines, which may be straight or curved. The line that represents the object may itself be represented parametrically, for example the line may be a spline, Bezier curve, etc. Alternatively, the line that represents the object may be represented as a vector, e.g. by two points (e.g. in 3D space), a point and gradient (e.g. in 3D space), etc.

As will be appreciated, in practice, a similar process may be performed for each one of plural pairs of first and second layer points (e.g. for the line).

As will also be appreciated, in practice, the object may be represented by plural lines. In these embodiments, tool path data may be generated in a similar manner for each line of the plural lines that represent the object.

As will also be appreciated, in practice, a particular additive manufacturing apparatus may use plural build layers. Thus, tool path data may be generated in a similar manner for each build layer of plural build layers for a particular additive manufacturing apparatus.

In any of the aspects or embodiments described herein, at least a part of the object may also or instead be represented by a first layer line that lies within a first build layer and a second layer line that lies within a second build layer. These embodiments may comprise projecting the second layer line to a projected layer line that lies within the first build layer, and using the first layer line and projected layer line to provide tool path data for the first build layer. This arrangement is considered to be new and advantageous in its own right, and not merely in the context of the other aspects and embodiments described herein.

Thus, according to another aspect of the present invention, there is provided a method of generating tool path data for use in additive manufacturing, the method comprising:
providing object design data in which at least a part of the object is represented by a first layer line that lies within a first build layer and a second layer line that lies within a second build layer;
projecting the second layer line to a projected layer line that lies within the first build layer; and
using the first layer line and projected layer line to provide tool path data for the first build layer.

In any of the aspects or embodiments described herein, at least a part of the object may also or instead be represented by a surface. In any of the aspects or embodiments described herein the surface can be defined in the object design data in any desired and suitable way. These embodiments may comprise slicing the surface to generate the first layer line that lies within the first build layer and the second layer line that lies within the second build layer.

Thus, according to another aspect of the present invention, there is provided a method of generating tool path data for use in additive manufacturing, the method comprising:
providing object design data in which at least a part of the object is represented by a surface;
slicing the surface to generate a first layer line that lies within a first build layer and a second layer line that lies within a second build layer;
projecting the second layer line to a projected layer line that lies within the first build layer; and
using the first layer line and projected layer line to provide tool path data for the first build layer.

The present invention in these aspects and their embodiments accordingly provides a way to generate tool path data from layer lines and/or surfaces that represent the object (e.g. in an abstract and/or parametric manner), for example without generating closed contours directly from a volumetric (e.g. STL) representation of the object. This again means that the process of generating the tool path data can be less computationally intensive. The resultant tool path data can also be closer to the resolution of a particular additive manufacturing apparatus to be used to make the object, both in terms of the thickness of the build layers used by that additive manufacturing apparatus and in terms of a thickness of material that can be achieved by that additive manufacturing apparatus using a single tool path line. The tool path data can also be quicker for an additive manufacturing apparatus to implement and produce objects having finer detail and/or superior material and/or structural properties, when compared with existing additive manufacturing arrangements.

Embodiments may comprise, prior to slicing the surface, moving an edge node at an edge of the surface to an edge node layer point within a build layer. These embodiments may comprise moving plural edge nodes at one or more edges of the surface to edge node layer points within respective build layers. In embodiments, an edge node may be moved to the nearest build layer, moved downwards to the next build layer, or moved upwards to the next build layer for that edge node. In embodiments, one or more edge node layer points may be used as part of the first layer line and/or second layer line.

In embodiments, slicing the surface to generate the first layer line and/or second layer line may comprise determining an intersection layer line at the intersection of the surface and a build layer. In these embodiments, slicing the surface to generate the first layer line and/or second layer line may comprise determining plural intersection layer lines at the intersections of the surface and respective build layers. In embodiments, an intersection layer line may be used as the first layer line and/or an intersection layer line may be used as the second layer line.

In embodiments, the second layer line may be projected downwards or upwards to the first build layer.

Embodiments may comprise generating (e.g. interpolating) further layer lines between the first layer line and the projected layer line to provide tool path data for the first build layer, for example where the spacing between the first layer line and the projected layer line is greater than the thickness of material that can be achieved by a particular additive manufacturing apparatus using a single tool path line.

Embodiments may also or instead comprise using the first layer line and the projected layer line to generate a closed contour and using the closed contour to provide tool path data for the first build layer, for example where the spacing between the first layer line and the projected layer line is greater than the thickness of material that can be achieved by a particular additive manufacturing apparatus using a single tool path line.

Embodiments may also or instead comprise offsetting or thickening the surface to generate a first offset face. The offsetting or thickening may be in a first direction that is substantially parallel to the first build layer and/or second build layer. The offsetting or thickening may be in a first direction that is substantially normal to the surface. The offsetting or thickening may comprise offsetting or thickening by a distance that is greater than or substantially equal to the thickness of material that can be achieved by a particular additive manufacturing apparatus using a single tool path line and/or greater than or substantially equal to the thickness of the build layers for a particular additive manufacturing apparatus.

These embodiments may comprise slicing the first offset face to generate a first offset face layer line that lies within the first build layer, for example along the intersection of the first offset face and the first build layer. The first layer line and the first offset face layer line may be used to generate a first closed contour within the first build layer. Alternatively, the first offset face and the surface may define a first thickened surface. The first thickened surface may be sliced to generate the first closed contour within the first build layer. The first closed contour may comprise the first layer line and the first offset face layer line.

Embodiments may also or instead comprise offsetting or thickening the surface to generate a second offset face. The offsetting or thickening may be in a second direction that is substantially parallel to the first build layer and/or second build layer. The offsetting or thickening may be in a second direction that is substantially normal to the surface. The offsetting or thickening may be in a second direction that is substantially opposite to the first direction. The offsetting or thickening may comprise offsetting or thickening by a distance that is greater than or substantially equal to the thickness of material that can be achieved by a particular additive manufacturing apparatus using a single tool path line and/or greater than or substantially equal to the thickness of the build layers for a particular additive manufacturing apparatus.

These embodiments may comprise slicing the second offset face to generate a second offset face layer line that lies within the second build layer, for example along the intersection of the second offset face and the second build layer. The second layer line and the second offset face layer line may be used to generate a second closed contour within the second build layer. Alternatively, the second offset face and the surface may define a second thickened surface. The second thickened surface may be sliced to generate the second closed contour within the second build layer. The second closed contour may comprise the second layer line and the second offset face layer line.

Embodiments may comprise projecting the second closed contour to a projected closed contour that lies within the first build layer. In embodiments, the second closed contour may be projected downwards or upwards to the first build layer. The projected closed contour may overlap the first closed contour. A first combined closed contour may be generated from the first closed contour and the projected closed contour. The first combined closed contour may be generated from the overlapping parts of the first closed contour and the projected closed contour, for example using a Boolean intersection. The first combined closed contour may be used to provide tool path data for the first build layer.

Thus, embodiments may comprise offsetting or thickening the surface to generate a first offset face, slicing the first offset face to generate a first offset face layer line that lies within the first build layer, using the first layer line and the first offset face layer line as part of a first closed contour within the first build layer, offsetting or thickening the surface to generate a second offset face, slicing the second offset face to generate a second offset face layer line that lies within the second build layer, using the second layer line and the second offset face layer line as part of a second closed contour within the second build layer, projecting the second closed contour to a projected closed contour that lies within the first build layer, generating a first combined closed contour from overlapping parts of the first closed contour and the projected closed contour, and using the first combined closed contour to provide tool path data for the first build layer.

Embodiments may comprise slicing the first offset face to generate plural first offset face layer lines that lie within respective build layers, for example along the intersections of the first offset face and the respective build layers. The plural intersection layer lines for the surface and the plural first offset face layer lines may be used to generate plural first closed contours within the respective build layers. Alternatively, embodiments may comprise slicing the first thickened surface to generate plural first closed contours within the respective build layers, for example along the intersections of the first thickened surface and the respective build layers.

Similarly, embodiments may comprise slicing the second offset face to generate plural second offset face layer lines that lie within respective build layers, for example along the intersections of the second offset face and the respective build layers. The plural intersection layer lines for the surface and the plural second offset face layer lines may be used to generate plural second closed contours within the respective build layers. Alternatively, embodiments may comprise slicing the second thickened surface to generate plural second closed contours within the respective build layers, for example along the intersections of the second thickened surface and the respective build layers.

These embodiments may comprise projecting the plural second closed contours to plural projected second closed contours that lie within the respective build layers. In embodiments, the plural second closed contours may be projected downwards or upwards to the respective build layers. One or more of the plural projected second closed contours may overlap one or more of the plural first closed contours. A first set of one or more combined closed contours may be generated from the plural projected second closed contours and the plural first closed contours. The first set of one or more combined closed contour may be generated from the overlapping parts of the plural projected second closed contours and the plural first closed contours. The first set of one or more combined closed contours may be used to provide tool path data for the respective build layers.

Similarly, these embodiments may comprise projecting the plural first closed contours to plural projected first closed contours that lie within the respective build layers. In embodiments, the plural first closed contours may be projected downwards or upwards to the respective build layers. In embodiments, the plural first closed contours may be projected in the same direction as the plural second closed contours. One or more of the plural projected first closed contours may overlap one or more of the plural second closed contours. A second set of one or more combined closed contours may be generated from the plural projected first closed contours and the plural second closed contours. The second set of one or more combined closed contour may be generated from the overlapping parts of the plural projected first closed contours and the plural second closed contours. The second set of one or more combined closed contours may be used to provide tool path data for the respective build layers.

In embodiments, the surface may have a thickness specified in the object design data. In embodiments, the specified thickness may be substantially equal to a thickness of material that can be achieved by a particular additive manufacturing apparatus using a single tool path line. In embodiments, the thickness may be indicated in the tool path data. Thus, in embodiments, at least part of the object may be represented abstractly and/or parametrically by the surface (e.g. with a specified thickness for the surface), for example rather than volumetrically (e.g. by a closed net of polygons that enclose a volume, such as in STL). Thus, in embodiments, the surface may not form part of a volumetric (e.g. STL) representation of the object. The surface may, for example, be open (i.e. not a closed or self-intersecting surface and/or not part of a closed or self-intersecting surface). For example, in embodiments, a (thin) wall structural feature of an object may be represented by a surface (e.g. with a specified thickness) rather than by a net of polygons that enclose the volume of the wall structural feature of the object.

In embodiments, the surface that represents the object may be planar or curved. Thus, in embodiments, a layer line may be a straight line, a polyline or a curved line. The surface that represents the object may itself be represented parametrically, for example the surface may be a Bezier surface, etc. Alternatively, the surface that represents the object by be represented as a plane, e.g. with three points (e.g. in 3D space), two intersecting or parallel lines (e.g. in 3D space), a point and surface normal (e.g. in 3D space), etc.

As will be appreciated, in practice, a similar process may be performed for each one of plural pairs of first and second layer lines for the surface.

As will also be appreciated, in practice, the object may be represented by plural surfaces. In these embodiments, tool path data may be generated in a similar manner for each surface of plural surfaces that represent the object.

As will also be appreciated, in practice, a particular additive manufacturing apparatus may use plural build layers. Thus, tool path data may be generated in a similar manner for each build layer of plural build layers for a particular additive manufacturing apparatus.

As will also be appreciated, in practice, the object may be represented by one or more points and/or one or more lines and/or one or more surfaces. In these embodiments, tool path data may be generated in a similar manner for each point and/or each line and/or each surface of the one or more points and/or lines and/or surfaces that represent the object.

In any of the aspects or embodiments described herein, at least a part of the object may also or instead be represented by a volume-surrounding surface. The expression "volume-surrounding surface" used herein is intended to encompass any surface that substantially or completely surrounds or encloses a volume. The volume-surrounding surface may therefore comprise an open or closed surface. The volume-surrounding surface may, for example, comprise a substantially cylindrical surface, such as a surface of an open or closed cylinder. The expression "substantially cylindrical surface" used herein is not intended to be limited merely to surfaces of circular cylinders (cylinders of circular cross-section) but may also encompass other substantially similar surfaces, such as surfaces of right or oblique cylinders, open or closed elliptical or oval cylinders (cylinders of elliptical or oval cross-section), etc. The volume-surrounding surface may comprise other types of volume-surrounding surface. For example, the volume-surrounding surface may comprise a surface of an n-gonal prism (where n is a positive integer), a surface of an I-beam, a surface that forms a helix, a surface having a spiral cross-section (e.g. a rolled or coiled surface), etc.

These embodiments may comprise generating a (open or closed) contour at the intersection of the volume-surrounding surface and a build layer, and using the contour to provide tool path data for the build layer. This arrangement is considered to be new and advantageous in its own right, and not merely in the context of the other aspects and embodiments described herein.

Thus, according to another aspect of the present invention, there is provided a method of generating tool path data for use in additive manufacturing, the method comprising:
  providing object design data in which at least a part of the object is represented by a volume-surrounding surface;
  generating a contour at the intersection of the volume-surrounding surface and a build layer; and
  using the contour to provide tool path data for the build layer.

As discussed above, in embodiments, at least a part of the object may be represented by a line (e.g. that passes through a build layer), for example having a specified thickness greater than a thickness of solid material that can be achieved by a particular additive manufacturing apparatus using a single tool path line. These embodiments may comprise generating the (open or closed) contour for the build layer around the line. In embodiments, at least a part of the object may be represented by one or more layer points, for example a series of layer points corresponding to a line (e.g. a series of layer points on a line) that represents the object. These embodiments may comprise generating the (open or closed) contour for the build layer around one or more of the layer points.

Thus, according to another aspect of the present invention, there is provided a method of generating tool path data for use in additive manufacturing, the method comprising:
  providing object design data in which at least a part of the object is represented by a line or layer point;
  generating a contour for a build layer around the line or layer point; and using the contour to provide tool path data for the build layer.

These aspects and embodiments may comprise directly generating the (open or closed) contour around the line or layer point, for example without generating a volume-surrounding surface around the line or layer point. Alternatively, these aspects and embodiments may comprise generating a volume-surrounding surface around the line or layer point and generating the (open or closed) contour at the intersection of the volume-surrounding surface and the build layer.

Thus, according to another aspect of the present invention, there is provided a method of generating tool path data for use in additive manufacturing, the method comprising:

providing object design data in which at least a part of the object is represented by a line or layer point;

generating a volume-surrounding surface around the line or layer point;

generating a contour at the intersection of the volume-surrounding surface and a build layer; and using the contour to provide tool path data for the build layer.

The present invention in these aspects and their embodiments accordingly provide a way to generate tool path data from object design data for an object that is represented, at least in part, by a volume-surrounding surface, line or layer point, for example where the thickness of a desired structural feature in the object that the volume-surrounding surface, line or layer point represents may be greater than a thickness of solid material that can be achieved by a particular additive manufacturing apparatus using a single tool path line. A diameter of the (open or closed) contour may accordingly be substantially equal to the thickness of the desired structural feature that the volume-surrounding surface, line or layer point represents.

Embodiments may comprise providing a rolled or coiled volume-surrounding surface, or generating a rolled or coiled volume-surrounding surface around the line or layer point, for example where the thickness of the desired structural feature in the object that the rolled or coiled volume-surrounding surface, line or layer point represents is greater than plural times the thickness of material that can be achieved by the additive manufacturing apparatus using a single tool path line.

Alternatively, embodiments may comprise providing plural volume-surrounding surfaces, or generating plural volume-surrounding surfaces around the line or layer point, for example where the thickness of the desired structural feature in the object that the volume-surrounding surfaces, line or layer point represents is greater than plural times the thickness of material that can be achieved by the additive manufacturing apparatus using a single tool path line.

The spacing between opposing parts of the surface of the rolled or coiled volume-surrounding surface or between the opposing surfaces of the plural volume-surrounding surfaces may be substantially equal to the thickness of solid material that can be achieved by a particular additive manufacturing apparatus using a single tool path line.

Embodiments may comprise generating a spiral contour around the line or layer point (e.g. corresponding to a slice through the rolled or coiled volume-surrounding surface) and/or generating a spiral contour at the intersection of the rolled or coiled volume-surrounding surface and the build layer. Alternatively, embodiments may comprise generating plural concentric contours for the build layer (e.g. corresponding to a slice through the plural volume-surrounding surfaces) around the line or layer point and/or generating plural concentric contours at the respective intersections of the plural volume-surrounding surfaces and the build layer.

A diameter of the spiral or of the outermost contour may accordingly be substantially equal to the thickness of the desired structural feature that the plural volume-surrounding surfaces, line or layer point represents. The spacing between the turns of the spiral or between the plural concentric contours may also be substantially equal to the thickness of solid material that can be achieved by a particular additive manufacturing apparatus using a single tool path line. These embodiments may comprise using the spiral contour or one or more of the plural concentric contours to provide tool path data for the build layer.

As discussed above, in practice, the object may be represented by plural volume-surrounding surfaces, lines or layer points, e.g. representing respective features of the object. In these embodiments, tool path data may be generated in a similar manner for each volume-surrounding surface, line or layer point of the plural volume-surrounding surfaces, lines or layer points that represent the object.

For example, the object may be represented by first and second intersecting volume-surrounding surfaces. These embodiments may comprise generating a first contour at the intersection of the first volume-surrounding surface and a build layer, and a second contour at the intersection of the second volume-surrounding surface and the build layer, the second contour overlapping the first contour; generating a combined contour from the first and second contours; and using the combined contour to provide tool path data for the build layer. The combined contour may be generated from the non-overlapping parts of the first and second contours.

For another example, the object may be represented by first and second (e.g. intersecting or neighbouring) lines or layer points. These embodiments may comprise generating a first contour for the build layer around the first line or layer point, and a second contour for the build layer around the second line or layer point, the second contour overlapping the first contour; generating a combined contour from the first and second contours; and using the combined contour to provide tool path data for the build layer. The combined contour may be generated from the non-overlapping parts of the first and second contours.

For another example, the object may be represented by first and second (e.g. intersecting or neighbouring) lines or layer points. These embodiments may comprise generating a first volume-surrounding surface around the first line or layer point and a second volume-surrounding surface around the second line or layer point; generating a first contour at the intersection of the first volume-surrounding surface and a build layer, and a second contour at the intersection of the second volume-surrounding surface and the build layer, the second contour overlapping the first contour; generating a combined contour from the first and second contours; and using the combined contour to provide tool path data for the build layer. The combined contour may be generated from the non-overlapping parts of the first and second contours.

As mentioned above, plural volume-surrounding surfaces and/or plural concentric contours may be provided or generated, e.g. for one or more features of the object. In these embodiments, plural combined contours may be generated from plural corresponding (e.g. in terms of diameter) concentric contours.

As will be appreciated, in practice, a similar process may be performed for each one of plural pairs of intersecting volume-surrounding surfaces and/or for each one of plural pairs of (e.g. intersecting or neighbouring) lines or layer points.

As will also be appreciated, in practice, a particular additive manufacturing apparatus may use plural build layers. In these embodiments, tool path data may be generated in a similar manner for each build layer of plural build layers for a particular additive manufacturing apparatus.

In any of the aspects or embodiments described herein, a tool path may be provided along a or each (open or closed) contour. Alternatively, one or more tool paths may be provided within a or each (open or closed) contour, for example using a method of generating tool path data from a (open or closed) contour as described herein in any aspect or embodiment.

In any of the aspects or embodiments described herein, once tool path data has been provided, the one or more tool paths of the tool path data may be reconfigured to reduce the overall distance travelled and/or travel time when implementing the tool path data. This arrangement is considered to be new and advantageous in its own right, and not merely in the context of the other aspects and embodiments described herein.

Thus, according to another aspect of the present invention, there is provided a method of generating tool path data for use in additive manufacturing, the method comprising:
  providing tool path data comprising one or more tool paths; and
  reconfiguring the one or more tool paths to reduce the overall distance travelled and/or travel time when implementing the tool path data.

The present invention in this aspect and its embodiments accordingly provides a way to generate tool path data, for example that can be quicker for the additive manufacturing apparatus to implement when compared with existing additive manufacturing arrangements. In embodiments, when reducing the overall distance travelled and/or travel time, consideration may be given to reducing the total distance of the one or more tool paths and/or reducing the number of tool paths. In embodiments, account may also be taken of the dynamic (movement) capabilities of the tool to be used to implement the tool path data, such as the tool's velocity, mass or momentum in use and/or the force or acceleration that can be applied by the additive manufacturing machine when altering the position and/or direction of travel of the tool in use.

In embodiments, providing the tool path data may comprise generating tool path data from one or more points and/or one or more lines and/or one or more surfaces and/or one or more volume-surrounding surfaces and/or one or more contours, for example in a manner as described herein in any aspect or embodiment and/or in a conventional manner.

In embodiments, providing the tool path data may comprise providing tool path points, for example within a (open or closed) contour. The tool path points may be provided by a fixed pattern of points and/or a regular or irregular distribution (e.g. selected based on the shape of the contour) and/or a statistical distribution (e.g. provided based on the shape of the contour). The expression "statistical distribution" used herein is intended to encompass any function, in accordance with which the points may be distributed, that describes the probability of tool path points being present with respect to a set of possible positions for the tool path points. Thus, a greater number of tool path points may tend to be provided at positions indicated by the statistical distribution as having higher probabilities and/or a lesser number of tool path points or no tool path points may tend to be provided at positions indicated by the statistical distribution as having lower or zero probabilities (although given the statistical nature of the distribution, this may not necessarily always be the case). The statistical distribution may be discrete or continuous across the set of possible positions. The statistical distribution may be based on a Poisson distribution. The statistical distribution may be based on a 2D Poisson Disk distribution.

These embodiments in which tool path points may be provided by a statistical distribution can provide a random but substantially even distribution of tool path points within a given contour, and thus can readily be used to provide an appropriate distribution of tool path points for contours that are not necessarily uniform or regular in shape. The distribution may be based on the geometry of a (open or closed) contour within which the tool path points are provided.

Providing the tool path data may comprise connecting the tool path points together. The tool path points may be connected together with a single tool path or plural tool paths. Connecting the tool path points together may comprise considering the set of the tool path points as a whole. Alternatively, connecting the tool path points together may comprise a nested process in which the tool path points are clustered into subsets of tool path points, with each cluster of tool path points then being considered separately. A nested process may be particularly effective for a larger set of tool path points by reducing the complexity of the connecting and/or reconfiguring process.

Connecting the tool path points together may comprise a recursive process that starts at one or more starting tool path points and then progresses to one or more neighbouring tool path points, and so on. The tool path points may be considered (e.g. by respective algorithmic "agents") starting at plural different starting tool path points. The tool path points may be considered (e.g. by respective algorithmic agents) in a greedy manner or in a cooperative manner.

Connecting the tool path points together may comprise a nearest neighbour process in which a (e.g. each) particular tool path point is connected to a particular nearest (e.g. unconnected) neighbour. The nearest neighbour process may comprise, for a (e.g. each) particular tool path point, determining a cost value for one or more neighbouring tool path points, and then connecting the particular tool path point to a particular neighbouring tool path point having a lowest or a relatively lower cost value.

The cost value for a particular neighbouring tool path point may be based on one or more properties for the particular neighbouring tool relative to the particular tool path point. The cost value for a particular neighbouring tool path point may be determined based on a weighted combination (e.g. sum) of properties for the particular neighbouring tool relative to the particular tool path point.

For example, the cost value for a particular neighbouring tool path point may be or may be based on a Euclidean distance from the particular tool path point to the particular neighbouring tool path point. A lower Euclidean distance may correspond and/or correlate to a lower cost value. These embodiments can reduce the distance the tool needs to travel and/or time the tool needs to take when traversing two connected tool path points.

The cost value for a particular neighbouring tool path point also or instead may be or may be based on a turning angle between i) a connection from the particular tool path point to the particular neighbouring tool path point, and ii) a connection from the particular tool path point to a previous tool path point that has previously been connected to the particular tool path point. A lesser turning angle may correspond and/or correlate to a lower cost value. These embodiments can reduce the angle through which the tool needs to turn, and thus the distance the tool needs to travel and/or time the tool needs to take, when traversing three connected tool path points.

For tools that have greater velocity, mass or momentum in use and/or for additive manufacturing machines that can apply a lesser force or acceleration when altering the position of the tool in use, and thus are harder to deviate from a given tool path direction, a larger weighting may be applied to the turning angle when determining a weighted combination (e.g. sum) of the properties of the particular neighbouring tool relative to the particular tool path point. Conversely, for tools that have lesser velocity, mass or momentum in use and/or for additive manufacturing machines that can apply a greater force or acceleration when altering the position of the tool in use, and thus are easier to deviate from a given tool path direction, a lower weighting may be applied to the turning angle when determining a weighted combination (e.g. sum) of the properties of the particular neighbouring tool relative to the particular tool path point.

Thus, when connecting tool path points, consideration may be given to the dynamic (movement) capabilities of the tool to be used to implement the tool path data, such as the tool's velocity, mass or momentum in use and/or the force or acceleration that can be applied by the additive manufacturing machine when altering the position of the tool in use.

The cost value for a particular neighbouring tool path point also or instead may be or may be based on a non-Euclidean distance and/or Dubins path length from the particular tool path point to the particular neighbouring tool path point. A lower non-Euclidean distance and/or Dubins path length may correspond and/or correlate to a lower cost value. Again, these embodiments can reduce the distance the tool needs to travel and/or time the tool needs to take when traversing two connected tool path points.

The maximum curvature of the Dubins path may be less than or substantially equal to the maximum curvature that the tool can achieve (e.g. based on its velocity, mass or momentum in use and/or the redirection force or acceleration that can be applied in use). The starting path direction for the Dubins path may be the direction of the connection from the particular tool path point to a previous tool path point that has previously been connected to the particular tool path point. The finishing path direction for the Dubins path may be the direction from the particular neighbouring tool path point to a next tool path point to which the particular neighbouring tool path point may be connected.

Thus, again, when connecting tool path points, consideration may be given to the dynamic (movement) capabilities of the tool to be used to implement the tool path data, such as the tool's velocity, mass or momentum in use and/or the force or acceleration that can be applied by the additive manufacturing machine when altering the position of the tool in use.

In embodiments, reconfiguring the one or more tool paths may comprise using spatial sorting of lines and/or polylines of the one or more tool paths. The expression "spatial sorting" used herein is intended to encompass any ordering or reordering of the sequence in which the tool path points are connected and/or in which the tool paths will be followed by the additive manufacturing apparatus in use based on the relative spatial positions of the tool path points and/or tool paths. The spatial sorting may (again) comprise a nearest neighbour process (nearest neighbour spatial sorting). For example, when reconfiguring the one or more tool paths, account may (again) be taken of the Euclidian distance, turning angle, non-Euclidian distance and/or Dubins path length for the reconfigured connections. Thus, account may (again) be taken of dynamic (movement) capabilities of the tool to be used to implement the tool path data, such as the tool's velocity, mass or momentum in use and/or the force or acceleration that can be applied by the additive manufacturing machine when altering the position of the tool in use.

In embodiments, reconfiguring the one or more tool paths may comprise modifying (e.g. moving or changing) one or more starting tool path points, modifying (e.g. moving or changing) one or more intermediate tool path points and/or modifying (e.g. moving or changing) one or more ending tool path points.

In embodiments, when reconfiguring the one or more tool paths, a particular reconfiguration of the one or more tool paths may be selected for further consideration and/or use when the total distance travelled and/or the number of tool paths and/or the travel time is reduced as a result of the particular reconfiguration.

In embodiments, reconfiguring the one or more tool paths may comprise removing one or more overlapping lines and/or polylines of the one or more tool paths. In embodiments, reconfiguring the one or more tool paths may comprise removing a connection of a pair of connections provided for a particular tool path point when the turning angle between the pair of connections is greater than a threshold angle. The threshold angle may be based on the capabilities of the tool. For example, the threshold angle for a tool having greater velocity, mass or momentum in use and/or to which a lesser force or acceleration can be applied in use may be lower since that tool is less able to turn through greater angles, whereas the threshold angle for a tool having lower velocity, mass or momentum in use and/or to which a greater force or acceleration can be applied in use may be higher since that tool is more able to turn through greater angles.

In embodiments, reconfiguring the one or more tool paths may comprise reconfiguring the one or more tool paths non-deterministically. In embodiments, reconfiguring the one or more tool paths may comprise walking along the one or more tool paths and modifying the one or more tool paths based on a set of heuristics.

In other aspects and embodiments, reconfiguring the one or more tool paths may be optional. Thus, according to another aspect of the present invention, there is provided a method of generating tool path data for use in additive manufacturing, the method comprising providing tool path points (for example in a manner as described herein in any aspect or embodiment) and connecting the tool path points together (for example in a manner as described herein in any aspect or embodiment).

In any of the aspects or embodiments described herein, the tool path data may be provided for a structural feature of an object. As will be appreciated, in practice, the object may comprise plural structural features. In these embodiments, tool path data may be generated in a similar manner for each structural feature of the plural structural features of the object.

The tool path data may be provided for a build layer of a particular additive manufacturing apparatus. As will be appreciated, in practice, a particular additive manufacturing apparatus may use plural build layers. In these embodiments, tool path data may be generated in a similar manner for each build layer of the plural build layers for a particular additive manufacturing apparatus.

In any of the aspects or embodiments described herein, the object may have a structural feature. These embodiments may comprise selecting one or more additive manufacturing parameters to use in the additive manufacturing of the object based on the geometry of the structural feature; and providing tool path data for the structural feature that specifies the selected one or more additive manufacturing parameters for the structural feature. This arrangement is considered to be new and advantageous in its own right, and not merely in the context of the other aspects and embodiments described herein.

Thus, according to another aspect of the present invention, there is provided a method of generating tool path data for use in additive manufacturing, the method comprising:
providing object design data for an object that has a structural feature;
selecting one or more additive manufacturing parameters to use in the additive manufacturing of the object based on the geometry of the structural feature; and
providing tool path data for the structural feature that specifies the selected one or more additive manufacturing parameters for the structural feature.

The present invention in this aspect and its embodiments accordingly provides a way to generate tool path data that specifies one or more additive manufacturing parameters that are, for example, better suited to the geometry of a structural feature of the object. This can allow the additive manufacturing apparatus to implement and produce objects having finer detail and/or superior material and/or structural properties, when compared with existing additive manufacturing arrangements.

In embodiments, the geometry on which the selection is based may be one or more of: a length of the structural feature; a thickness of the structural feature; an angle between the structural feature and a build layer that intersects the structural feature; and a volume of material adjacent to the structural feature, for example that is to be solidified prior to the structural feature.

In embodiments, the angle may be between the plane of a build layer that intersects the structural feature and an axis either along the axial length of the structural feature (e.g. along the axial length of a substantially elongate structure) or through two points of the structural feature (e.g. through two points on a surface of a wall structure). In embodiments, the angle may be between the plane of a build layer that intersects the structural feature and a plane substantially parallel to a surface of the structural feature (e.g. a plane substantially parallel to a surface of a wall structure).

In embodiments, the structural feature may comprise one or more of: an intersection of two or more structures; a relative thickening or thinning of a structure; an end of a structure; a substantially elongate structure (e.g. a strut); and a (e.g. thin) wall structure.

In embodiments, the one or more additive manufacturing parameters may affect the amount of material deposited or solidified at a point of or along a tool path. In embodiments, the one or more additive manufacturing parameters may affect the amount of energy delivered to or dissipated from the material to be solidified at a point of or along a tool path.

In embodiments, the one or more additive manufacturing parameters may comprise or control one or more of: laser power at a point of or along a tool path; laser temporal switching frequency at a point of or along a tool path; laser spot size at a point of or along a tool path; laser dwell time at a point of a tool path; laser speed along a tool path; and spatial frequency of the points of solidification along a tool path.

In embodiments, the one or more additive manufacturing parameters may also or instead comprise or control the order in which points are solidified along a tool path. For example, for some structural features, adjacent points of solidification along a tool path may be solidified in sequential order, e.g. by solidifying a first point of solidification along the tool path, then a second point of solidification along the tool path (adjacent to the first point), and then a third point of solidification along the tool path (adjacent to the second point). However, for other structural features, adjacent points of solidification along a tool path may be solidified in non-sequential order, e.g. by solidifying a first point of solidification along the tool path, then a third point of solidification along the tool path (non-adjacent to the first point), and then a second point of solidification along the tool path (between the first and third points). These embodiments can, for example, control the rate of cooling for the structural feature. For example, a first point may be solidified by heating and then allowed to dissipate heat more slowly whilst an adjacent second point is being solidified. Alternatively, a first point may be solidified by heating and then allowed to dissipate heat more rapidly whilst a non-adjacent third point is being solidified.

In embodiments, the one or more additive manufacturing parameters may also be selected based on the build layer resolution or, inversely, build layer thickness of a particular additive manufacturing apparatus that is to be used to manufacture the object. In embodiments, the one or more additive manufacturing parameters may also be selected based on a particular material to be used for the structural feature.

In general, greater lengths, greater thicknesses, greater angles, greater adjacent solidified volumes of material, lower build layer resolutions, greater build layer thickness, and/or certain materials indicate using more solidification energy, whereas lesser lengths, lesser thicknesses, lesser angles, lesser adjacent solidified volumes of material, higher build layer resolutions, lesser build layer thickness, and/or certain other materials indicate using less solidification energy.

It has been found, for example, that greater angles and greater adjacent solidified volumes of material tend to indicate using more solidification energy because the thermal conductivity of substantially molten or solid or sintered or non-powder material adjacent to a structural feature to be solidified is generally greater than the thermal conductivity of substantially non-molten or non-solid or non-sintered or powder material adjacent a structural feature to be solidified.

In embodiments, the one or more additive manufacturing parameters may be selected using a database that stores additive manufacturing parameters and corresponding geometries and/or build layer resolutions or thicknesses and/or materials.

In embodiments, the one or more additive manufacturing parameters may be selected using a model of the relationship between additive manufacturing parameters and corresponding geometries and/or build layer resolutions or thicknesses and/or materials.

As will be appreciated, in practice, the object may comprise plural structural features. In these embodiments, tool path data may be generated in a similar manner for each structural feature of plural structural feature of the object.

In any of the aspects or embodiments described herein, providing the object design data may comprise generating object design data.

In any of the aspects or embodiments described herein, providing the object design data may comprise importing object design data that has previously been generated. The object design data may be imported via a tangible, non transitory medium, such as a computer readable medium, for example, diskette, CD ROM, ROM, RAM, flash memory, or hard disk. The object design data may also or instead be imported via an interface device, either over a tangible medium, including but not limited to optical or analogue communications lines, or intangibly using wireless techniques, including but not limited to microwave, infrared or other transmission techniques.

In any of the aspects or embodiments described herein, the object design data may (e.g. initially) be provided in a first representation. The first representation may comprise a volumetric (e.g. Computer Aided Design (CAD) or STL) representation. The first representation may comprise a set of one or more polygons. A polygon may be represented by the coordinates of the vertices of that polygon.

In any of the aspects or embodiments described herein, the object design data may (e.g. subsequently) be provided in a closed contour representation. In these embodiments, providing the object design data may comprise converting initial object design data from a first representation to the closed contour representation.

In any of the aspects or embodiments described herein, the object design data may (e.g. subsequently) be provided in a parametric (e.g. abstract) representation. The parametric representation can then be used to provide tool path data, for example using a method as described herein in any aspect or embodiment in which the object is represented by a parametric representation, such as one or more lines and/or one or more surfaces and/or one or more thicknesses (e.g. specified for a line or surface). This arrangement is considered to be new and advantageous in its own right, and not merely in the context of the other aspects and embodiments described herein.

Thus, according to another aspect of the present invention, there is provided a method of generating tool path data for use in additive manufacturing, the method comprising:
providing object design data in a parametric representation; and
using the parametric representation to provide tool path data.

The present invention in this aspect and its embodiments accordingly generates tool path data from a parametric representation of the object, for example rather than from a volumetric (e.g. STL) representation of the object. This means that the process of generating the tool path data can be less computationally intensive. The resultant tool path data can also be closer to the resolution of a particular additive manufacturing apparatus to be used to make the object, both in terms of the thickness of the build layers used by that additive manufacturing apparatus and in terms of a thickness of material that can be achieved by that additive manufacturing apparatus using a single tool path line. The tool path data can also be quicker for an additive manufacturing apparatus to implement and produce objects having finer detail and/or superior material and/or structural properties, when compared with existing additive manufacturing arrangements.

In embodiments, providing the object design data may comprise converting initial object design data from a first representation (for example a first representation as described above) to the parametric representation. The parametric representation may comprise one or more lines and/or one or more surfaces and/or one or more thicknesses (e.g. specified for a line or surface).

In any of the aspects or embodiments described herein, the generated tool path data may be combined with the tool path data generated in any other aspect or embodiment described herein, and/or with tool path data generated in a conventional manner, as desired.

In any of the aspects or embodiments described herein, a build layer can be a 2D plane or a 3D surface.

The method of any aspect or embodiment may be implemented in hardware (e.g. processing circuitry) and/or software as desired. The method of any aspect or embodiment may be computer implemented.

Thus, according to another aspect of the present invention, there is provided a data processing system for generating tool path data for use in additive manufacturing, the system comprising processing circuitry configured to perform a method of generating tool path data as described herein in any aspect or embodiment.

Similarly, according to another aspect of the present invention, there is provided a computer program comprising computer software code for performing a method of generating tool path data as described herein in any aspect or embodiment when the program is run on (e.g. a data processor of) a data processing system.

The tool path data generated in any aspect or embodiment may be used in additive manufacturing as desired.

Thus, according to another aspect of the present invention, there is provided a method of manufacturing a physical object using an additive manufacturing apparatus, for example that implements tool path data which has been generated in accordance with a method of generating tool path data as described herein in any aspect or embodiment.

Similarly, according to another aspect of the present invention, there is provided an additive manufacturing apparatus configured to manufacture a physical object, for example by following tool path data which has been generated in accordance with a method of generating tool path data as described herein in any aspect or embodiment.

Similarly, according to another aspect of the present invention, there is provided a physical object manufactured using an additive manufacturing apparatus, for example that implements tool path data which has been generated in accordance with a method of generating tool path data as described herein in any aspect or embodiment.

The physical object may have one or more material properties, for example at a specific (e.g. macroscopic) scale. The physical object may comprise a bulk material, for example at a specific (e.g. macroscopic) scale. The physical object may have one or more isotropic material properties. The physical object may have one or more anisotropic material properties. The physical object may have one or more material properties that vary across the physical object. The physical object may have one or more material properties that vary with orientation of the physical object. The physical object may comprise a substantially porous material.

The physical object may have a first set of one or more material properties in a first (e.g. loaded) state and a second set of one or more material properties in a second (e.g. unloaded) state. The physical object may comprise one or more re-entrant honeycomb structures. The physical object may comprise plural re-entrant honeycomb structures arranged in an array, such as a 2D or 3D array.

The physical object may comprise an outer surface. The physical object may comprise a substantially hollow interior. The physical object may comprise a lattice structure that supports the outer surface. The physical object may comprise one or more channels and/or chambers. The one or more channels and/or chambers may be arranged longitudinally. The lattice structure and/or one or more channels and/or chambers may be open, e.g. via one or more openings, slots or apertures, to the outer surface of the physical object substantially to prevent liquid or powder retention within the physical object following additive manufacturing. The physical object may comprise a mechanical linkage. The physical object may comprise a crank, such as a bike crank, or a piston rod.

The physical object may comprise plural closed loops. The physical object may comprise plural closed loops that are attached to one another. The physical object may comprise plural interlinked closed loops. The plural closed loops may form a substantially self-supporting structure during additive manufacture. The plural closed loops may be arranged in substantially regular columns and/or rows of closed loops. The physical object may comprise a substantially flexible structure. The physical object may comprise a chain or sheet material. The physical object may comprise a strap or belt. The physical object may comprise a watch strap. The physical object may comprise a strap or belt fastening. The fastening may comprise a clasp attached to a first end of the strap or belt. The clasp may comprise first and second opposed sections. The first and second opposed sections may be substantially rigid. The first and second opposed sections may be substantially planar. The planes of the first and second opposed sections may be substantially parallel to one another. The first and second opposed sections may be attached to one another along a side of the clasp. The first and second opposed sections may be spaced from one another along one or more or all of the other sides of the clasp (e.g. along the opposite side and/or adjacent side(s) of the clasp). The first and second opposed sections may form a substantially U-shaped cross section. The clasp may be removably fastenable to a second end of the strap or belt by an interference, friction or interlocking fit when the second end of the strap or belt is inserted into the clasp, e.g. between the first and second sections. The second end of the strap or belt may be laterally insertable into the clasp, e.g. between the first and second sections. The clasp may retain the ends of the strap or belt together longitudinally or circumferentially, e.g. when the strap or belt is worn.

The physical object may comprise one or more (e.g. thin) walls. The one or more walls may be represented in the object design data by one or more surfaces, for example as described herein in any aspect or embodiment. The physical object may comprise a honeycomb structure, a foam structure, an open or closed cell structure (e.g. bone graft), or a structure comprising one or more fins or partitions (e.g. for structural support or increased surface area).

The present invention can be used for all forms of additive manufacturing, such as additive manufacturing comprising selective deposition of a material and/or selective solidification of a material. Solidification may comprise melting, fusion, setting, binding and/or curing. The material to be selectively deposited and/or solidified may be liquid or powder. The material to be selectively deposited and/or solidified may comprise metallic, plastic and/or resin material.

In some embodiments, the data processing system and/or additive manufacturing apparatus comprises, and/or is in communication with, one or more memories and/or memory devices that store object design data and/or tool path data as described herein, and/or store software code for performing a method as described herein. The data processing system may be in communication with a computer system that generates and/or provides the object design data and/or may be in communication with the additive manufacturing apparatus. The tool path data may be provided to the additive manufacturing apparatus via a tangible, non transitory medium, such as a computer readable medium, for example, diskette, CD ROM, ROM, RAM, flash memory, or hard disk. The tool path data may also or instead be provided to the additive manufacturing apparatus via an interface device, either over a tangible medium, including but not limited to optical or analogue communications lines, or intangibly using wireless techniques, including but not limited to microwave, infrared or other transmission techniques.

The present invention can be implemented in any suitable data processing system, such as a suitably configured computer and/or processor based system. The various functions of the present invention can be carried out in any desired and suitable manner. For example, the functions of the present invention can be implemented in hardware or software, as desired. Thus, for example, unless otherwise indicated, the various functional elements and "means" of the present invention may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

The methods in accordance with the present invention may be implemented at least partially using software and/or computer programs, e.g. CAD software and/or software plugins. Thus, further embodiments of the present invention comprise computer software specifically adapted to carry out a method as described herein when installed on a data processor, a computer program element comprising computer software code portions for performing a method as described herein when the program element is run on a data processor, and a computer program comprising code adapted to perform all the steps of a method as described herein when the program is run on a data processor.

The present invention also extends to a computer software carrier comprising such software which when used to operate a data processing system comprising a data processor causes in conjunction with said data processor said system to carry out the steps of a method as described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the present invention need be carried out by computer software and thus further embodiments of the present invention comprise computer software and such software installed on a computer software carrier for carrying out at least one of the steps of a method as described herein.

The present invention may accordingly be suitably embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

It will also be appreciated by those skilled in the art that all of the described embodiments of the present invention can, and in embodiments do, include, as appropriate, any one or more or all of the features described herein.

BRIEF DESCRIPTION OF THE DRAWINGS

Various embodiments of the present invention will now be described by way of example only and with reference to the accompanying drawings, in which:

FIG. 4 illustrates a method of generating tool path data from a surface according to embodiments of the present invention;

FIG. 8 illustrates another method of generating and reconfiguring tool path data according to embodiments of the present invention;

DETAILED DESCRIPTION

Figure 1:
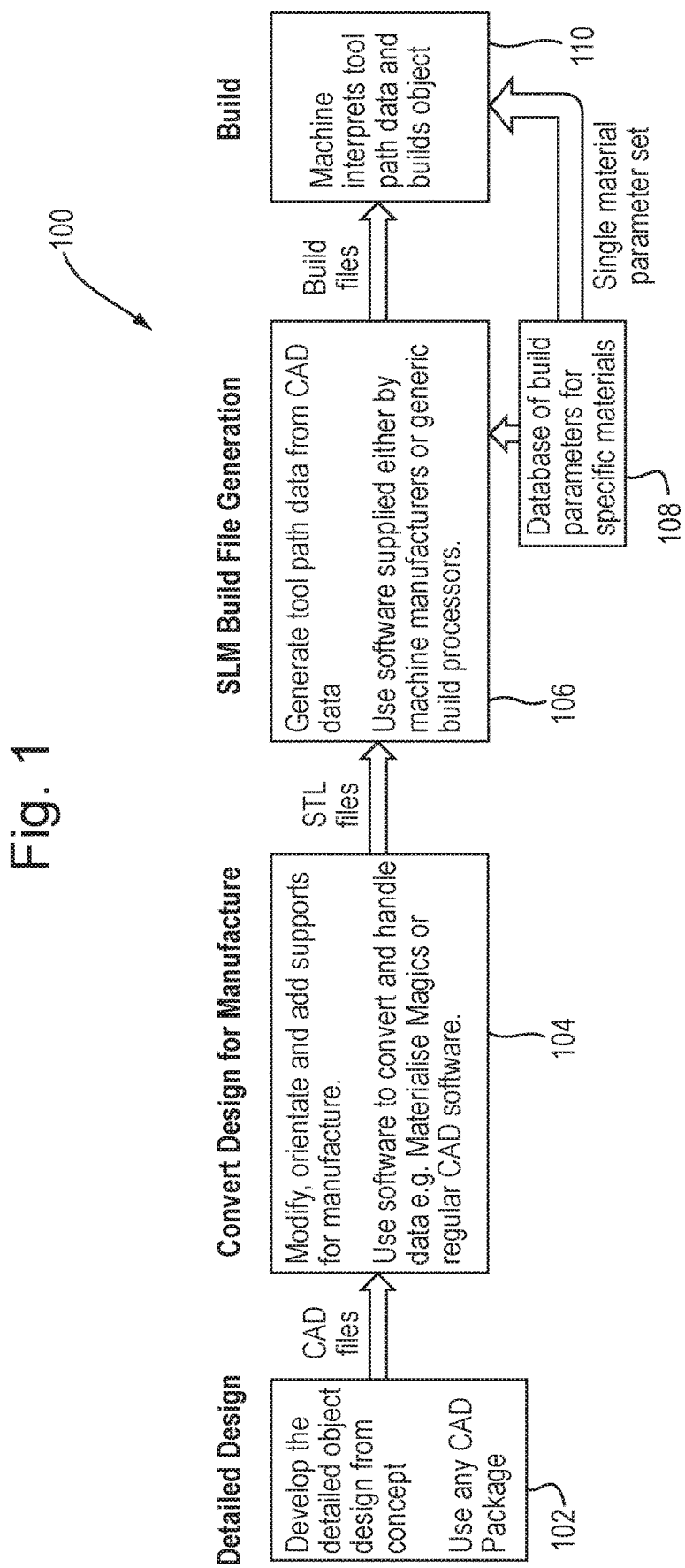
FIG. 1 shows a conventional method of generating and using tool path data.

FIG. 1 shows a conventional method of generating tool path data for use in additive manufacturing and using the tool path data to manufacture a physical object.

The method 100 begins at step 102. In step 102, object design data is developed from a design concept using conventional CAD (computer aided design) software. The object design data may comprise a volumetric representation of the object that comprises the vertices of polygons that form the object. Then, in step 104, the object design data is modified and orientated for additive manufacture, and supports are added if necessary for the additive manufacture, using software such as conventional CAD software or Materialise Magics. Then, in step 106, tool path data is generated from closed contours derived from the object design data using generic software or specific software for an additive manufacturing apparatus. The tool path data can be derived using a raster pattern of tool path points. Then, in step 108, a database provides additive manufacturing parameters, such as laser power, specific to a material to be used in the additive manufacturing. Then, in step 110, the additive manufacturing apparatus interprets the tool path data and builds the object using the specified additive manufacturing parameters for the material being used.

Figure 2:
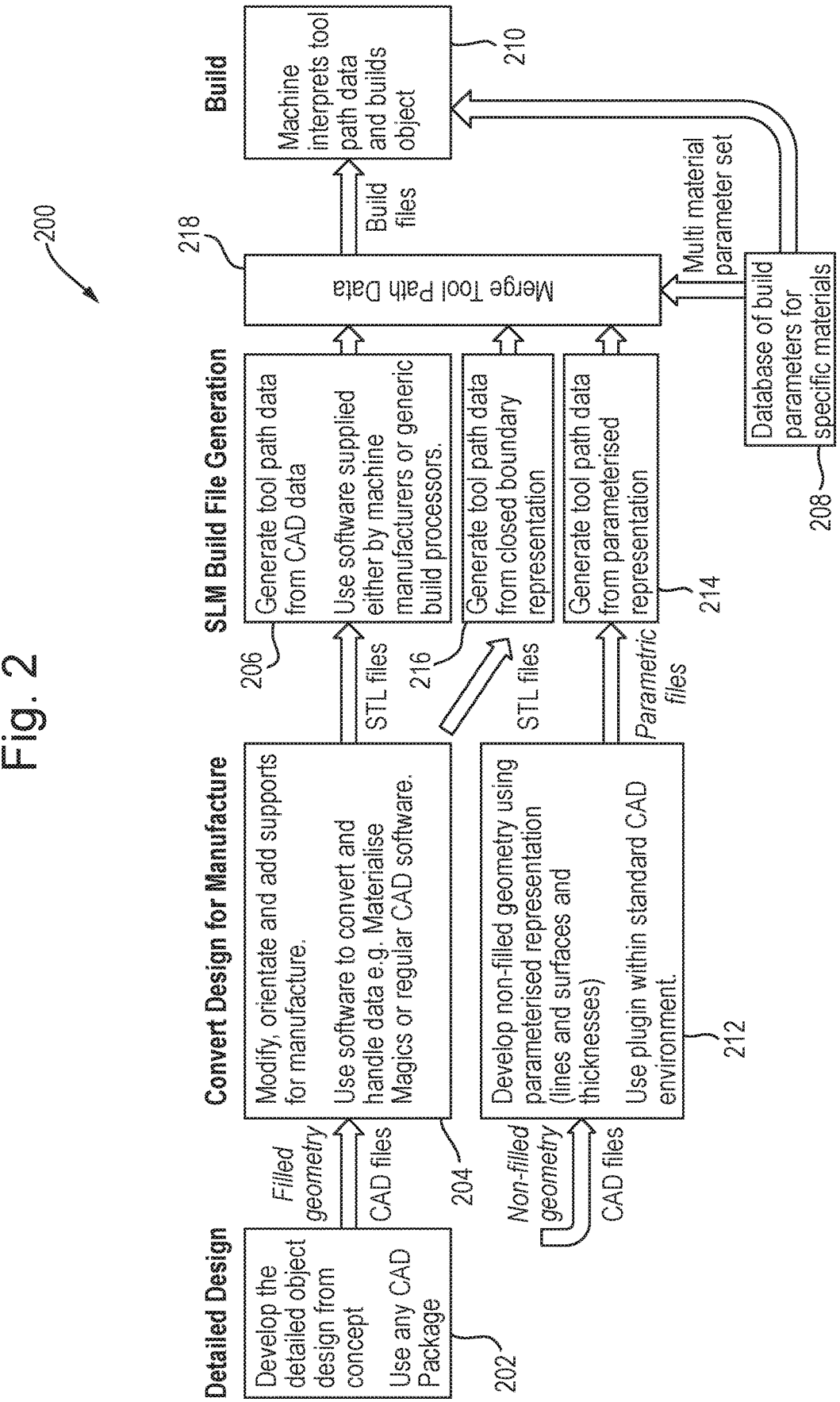
FIG. 2 shows a method of generating and using tool path data according to embodiments of the present invention.

FIG. 2 shows a method of generating tool path data for use in additive manufacturing and using the tool path data to manufacture a physical object according to embodiments of the present invention.

The method 200 begins at step 202. In step 202, object design data is again developed from a design concept using conventional CAD software. The object design data may comprise a volumetric representation of the object that comprises the vertices of polygons that form the object. Then, in step 204, the object design data for any filled geometry is modified and orientated for additive manufacture, and supports are added if necessary for the additive manufacture, using software such as conventional CAD software or Materialise Magics. Then, in step 206, tool path data is generated from closed contours derived from the object design data for any filled geometry using generic software or specific software for an additive manufacturing apparatus. The tool path data can be derived using a raster pattern of tool path points.

Also in this embodiment, in step 212, the object design data for any non-filled geometry is automatically converted to object design data that comprises a parametric representation using suitable software, such as a plugin for the otherwise conventional CAD software. The parametric representation defines lines and/or surfaces for non-filled geometry that have specified thicknesses. Then, in step 214, tool path data is automatically generated from the converted object design data for the non-filled geometry using suitable software. This step will be described in more detail below with reference to FIGS. 3, 4, 5 and 6. Also, in step 216, tool path data is automatically generated from the closed contours of the object design data for any filled geometry and reconfigured to reduce the tool path travel distance and travel time using suitable software. This step will be described in more detail below with reference to FIGS. 7 and 8. Then, in step 208, a database provides additive manufacturing parameters, such as laser power, based on the geometry of structural features within the object and the material to be used in the additive manufacturing. This step will be described in more detail below with reference to FIGS. 9 and 10. Then, in step 218, the various sets of tool path data are merged. Then, in step 210, the additive manufacturing apparatus interprets the merged tool path data and builds the object using the specified additive manufacturing parameters for the geometry of the structural features of that object and the material being used. Various objects that can be manufactured using the method 200 of FIG. 2 will be described in more detail below with reference to FIGS. 11, 12, 13, 14, 15 and 16.

Figure 3:
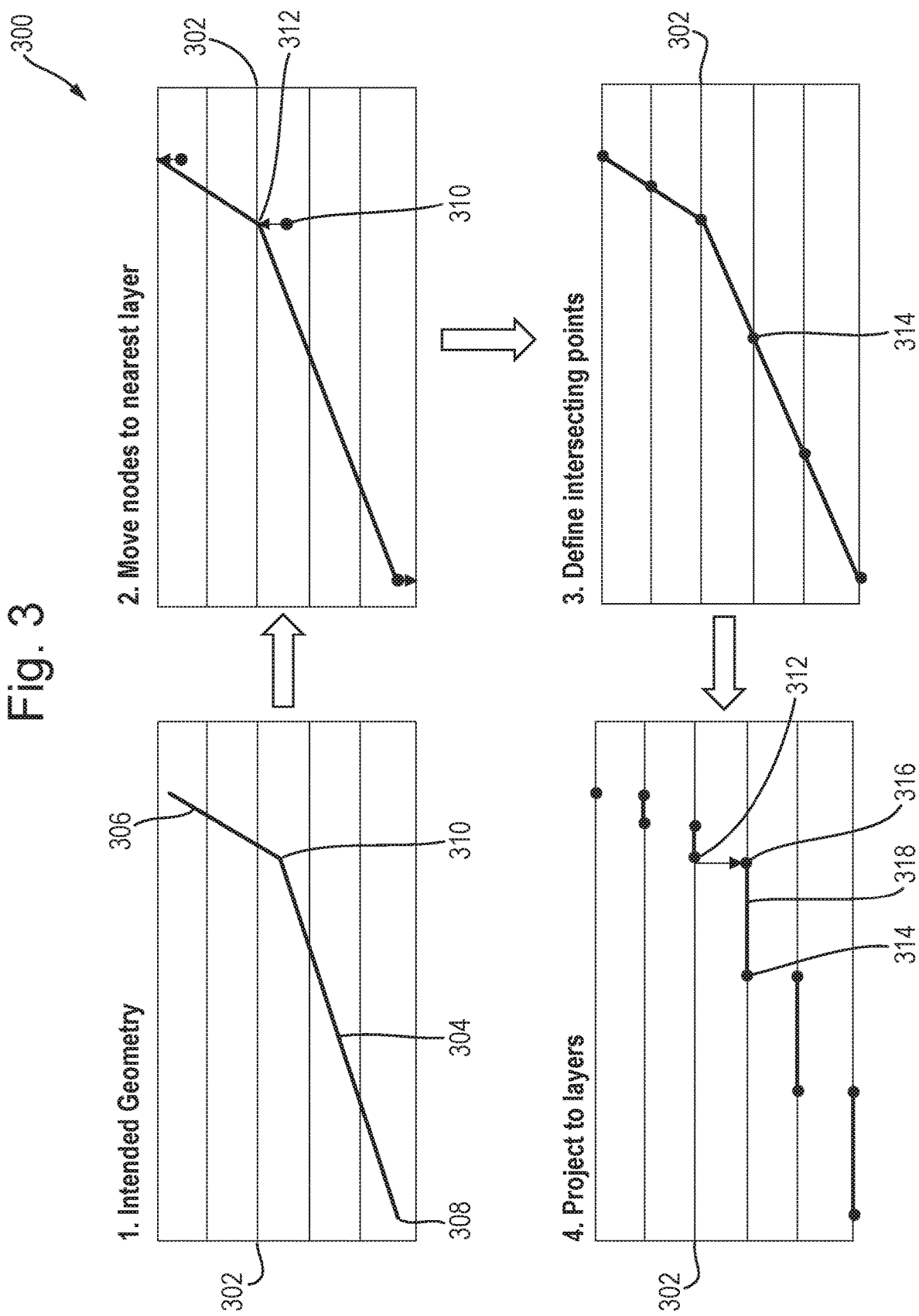
FIG. 3 illustrates a method of generating tool path data from a line according to embodiments of the present invention.

FIG. 3 illustrates a method of generating tool path data for a line according to embodiments of the present invention.

The method 300 begins in stage 1. In this embodiment, an object is represented in the object design data by a first line 304 and a second line 306. The first line 304 and the second line 306 are shown relative to plural build layers 302 for the additive manufacturing apparatus that will be used to manufacture the object. In this embodiment, the first line 304 and the second line 306 have a specified thickness equal to the minimum thickness that the additive manufacturing apparatus can produce with a single tool path. The first line 304 has a first end node 308 and a second end node 310. The second line 306 has similar end nodes, which are not referenced in the Figure.

Then, in stage 2, the end nodes of the lines are moved upwards or downwards to their nearest build layer to generate end node layer points. For example, the end node 310 of the first line 304 is moved up to the nearest build layer to generate an end node layer point 312.

Then, in stage 3, the lines are discretized by determining intersection layer points between the lines and the build layer. For example, an intersection layer point 314 between the first line and a build layer is determined. Other intersection layer points are also determined but are not referenced in the Figure.

Then, in stage 4, the end layer points and intersection layer points are projected downwards to projected layer points on the build layer below. For example, the end node layer point 312 is projected downwards to projected layer point 316 on the layer below. Other projected layer points are also determined but are not referenced in the Figure. The layer points within a build layer are then connected to provide tool path data for the build layer. For example, intersection layer point 314 is connected to projected layer point 316 to provide a tool path 318. Other tool paths are also determined but are not referenced in the Figure.

The method 300 of FIG. 3 accordingly provides an alternative way to generate tool path data, i.e. other than by generating closed contours directly from a volumetric representation of the object. This process of generating the tool path data can be less computationally intensive. The resultant tool path data can also be closer to the resolution of a particular additive manufacturing apparatus to be used to make the object, both in terms of the thickness of the build layers used by that additive manufacturing apparatus and in terms of a thickness of material that can be achieved by that additive manufacturing apparatus using a single tool path line. The tool path data can also be quicker for an additive manufacturing apparatus to implement and produce objects having finer detail and/or superior material and/or structural properties, when compared with existing additive manufacturing arrangements. In embodiments, viable structural feature thickness of <500 microns, and even 100 microns have been achieved.

Although the method 300 of FIG. 3 relates to two dimensional lines that provide one dimensional tool paths, it will be appreciated that the lines would generally be defined and processed in three dimensions and thus the tool path lines would generally be defined in the two dimensions of their respective build layers.

FIG. 4 illustrates a method of generating tool path data for a surface according to embodiments of the present invention.

The method 400 begins in stage 1. In this embodiment, an object is represented in the object design data by a surface 404. The surface 404 is shown relative to plural build layers 402 for the additive manufacturing apparatus that will be used to manufacture the object. In this embodiment, the surface 404 has a specified thickness equal to the minimum thickness that the additive manufacturing apparatus can produce with a single tool path.

Then, in stage 2, the end nodes 406 of the surface are moved upwards or downwards to their nearest build layer. Other end nodes are also moved but are not referenced in the Figure.

Then, in stage 3, the surface 404 is sliced to generate layer lines, such as layer line 408. Other layer lines are also generated but are not referenced in the Figure.

Then, in stage 4, the layer lines are projected downwards to projected layer lines on the build layer below. For example, projected layer line 410 is derived from the layer line in the build layer above. Other layer lines are also projected but are not referenced in the Figure. Further interpolated layer lines are also derived between the layer lines. For example, interpolated layer lines 412 are derived between layer lines 408 and 410. Other interpolated layer lines are also generated but are not referenced in the Figure. The layer lines and any interpolated layer lines are then provided as tool path data. Alternatively, layer lines 408 and 410 can be used to define a closed contour, which can then be filled with tool paths.

The method 400 of FIG. 4 accordingly again provides an alternative way to generate tool path data, i.e. other than by generating closed contours directly from a volumetric representation of the object. This process of generating the tool path data can again be less computationally intensive. The resultant tool path data can also be closer to the resolution of a particular additive manufacturing apparatus to be used to make the object, both in terms of the thickness of the build layers used by that additive manufacturing apparatus and in terms of a thickness of material that can be achieved by that additive manufacturing apparatus using a single tool path line. The tool path data can also be quicker for an additive manufacturing apparatus to implement and produce objects having finer detail and/or superior material and/or structural properties, when compared with existing additive manufacturing arrangements. As discussed above, in embodiments, viable structural feature thickness of <500 microns, and even 100 microns have been achieved.

Figure 5:
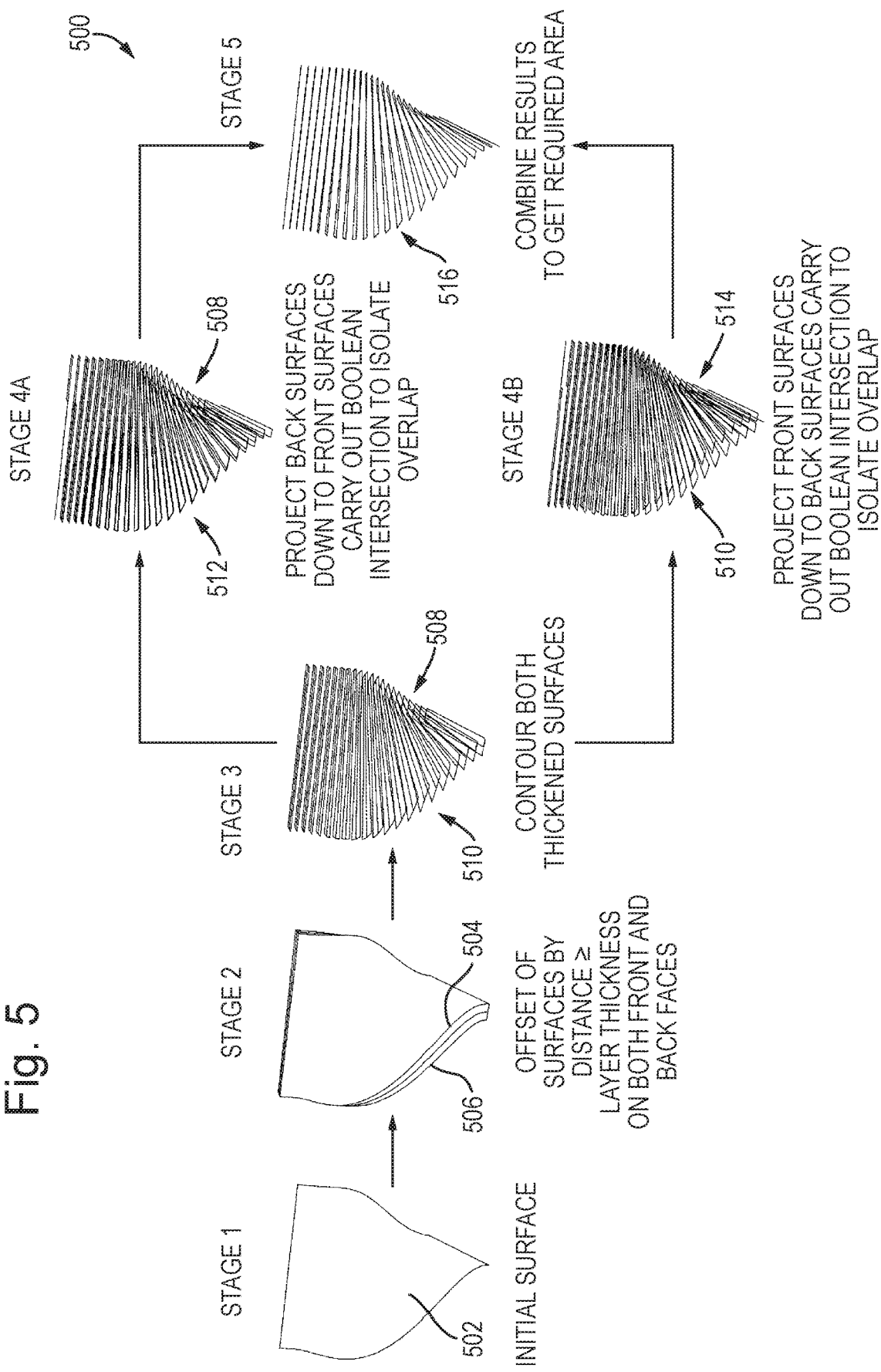
FIG. 5 illustrates a method of generating tool path data from a surface according to embodiments of the present invention.

FIG. 5 illustrates a further method of generating tool path data for a surface according to embodiments of the present invention.

The method 500 begins as shown in stage 1. In this embodiment, an object is represented in the object design data by a surface 502.

Then, in stage 2, a first offset face 504 of a first thickened surface is generated by offsetting or thickening the surface 502 in a first direction that is substantially normal to the surface 502 and that is substantially parallel to the horizontal build layers (not shown) for the additive manufacturing apparatus that will be used to manufacture the object. A second offset face 506 of a second thickened surface is also generated by offsetting or thickening the surface 502 in a second direction that is substantially normal to the surface 502 and that is substantially parallel to the build layers. In this embodiment, the offsets used are both greater than or substantially equal to the thickness of material that can be achieved by a particular additive manufacturing apparatus using a single tool path line, and are both greater than or substantially equal to the thickness of the build layers.

Then, in stage 3, the surface 502 is sliced at the build layers to generate plural intersection layer lines, the first offset face 504 is sliced at the build layers to generate plural first offset face layer lines, and the second offset face 506 is sliced at the build layers to generate plural second offset face layer lines. The plural intersection layer lines for the surface 502 and the plural first offset face layer lines of the first thickened surface form part of plural first closed contours 508 within the respective build layers. Similarly, the plural intersection layer lines for the surface 502 and the plural second offset face layer lines of the second thickened surface form part of plural second closed contours 510 within the respective build layers.

Then, in stage 4A, the plural second closed contours 510 of stage 3 are projected downwards to generate plural projected second closed contours 512 on the build layer below. In doing this, one or more of the plural projected second closed contours 512 overlap one or more of the plural first closed contours 508 on the build layer below. A first set of one or more combined closed contours is then generated from any overlapping parts of the plural projected second closed contours 512 and the plural first closed contours 508 using a Boolean intersection.

Also, in stage 4B, the plural first closed contours 508 of stage 3 are projected downwards to generate plural projected first closed contours 514 on the build layer below. In doing this, one or more of the plural projected first closed contours 514 overlap one or more of the plural second closed contours 510 on the build layer below. A second set of one or more combined closed contours is then generated from any overlapping parts of the plural projected first closed contours 514 and the plural second closed contours 510 using a Boolean intersection.

Then, in stage 5, the first and second sets of combined closed contours are merged to give a merged set of combined closed contours 516. As will be appreciated, the merged set of combined closed contours 516 comprises at least one instance of a closed contour for a build layer that is formed of: i) a layer line for the surface 502 that already lay within that build layer, and ii) a projected layer line that was generated by projecting a layer line for the surface 502 on to that build layer. The merged set of combined closed contours 516 are then used as tool paths and/or are then filled with tool paths.

The method 500 of FIG. 5 accordingly again provides an alterative way to generate tool path data, i.e. other than by generating closed contours directly from a volumetric representation of the object. This process of generating the tool path data can again be less computationally intensive. The resultant tool path data can also be closer to the resolution of a particular additive manufacturing apparatus to be used to make the object, both in terms of the thickness of the build layers used by that additive manufacturing apparatus and in terms of a thickness of material that can be achieved by that additive manufacturing apparatus using a single tool path line. The tool path data can also be quicker for an additive manufacturing apparatus to implement and produce objects having finer detail and/or superior material and/or structural properties, when compared with existing additive manufacturing arrangements. As discussed above, in embodiments, viable structural feature thickness of <500 microns, and even 100 microns have been achieved.

Figure 6:
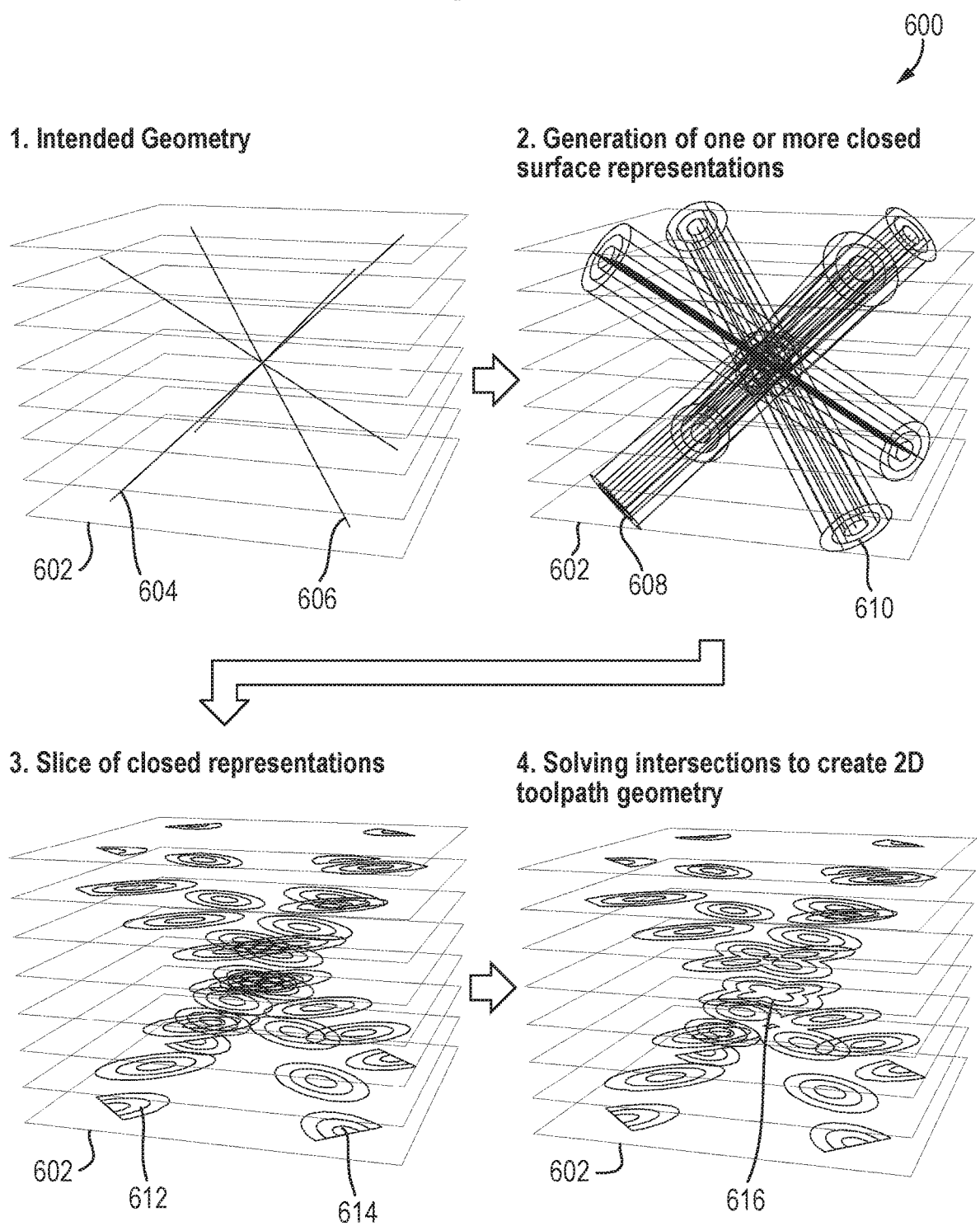
FIG. 6 illustrates a method of generating tool path data from intersecting lines according to embodiments of the present invention.

FIG. 6 illustrates a method of generating tool path data for intersecting lines according to embodiments of the present invention.

The method 600 begins in stage 1. In this embodiment, an object is represented in the object design data by four intersecting lines, including a first line 604 and a second line 606. The third and fourth line are shown but not referenced in the Figure. The lines are shown relative to plural build layers 602 for the additive manufacturing apparatus that will be used to manufacture the object.

In this embodiment, the lines have specified thicknesses substantially equal to three times the maximum thickness that the additive manufacturing apparatus can produce with a single tool path. Thus, in stage 2, a set of volume-surrounding surfaces in the form of substantially cylindrical surfaces is provided around each line. For example, a first set of three substantially cylindrical surfaces 608 is provided around the first line 604 and a second set of three substantially cylindrical surfaces 610 is provided around the second line 606. Other sets of substantially cylindrical surfaces are provided but are not referenced in the Figure. In this embodiment, the spacing between the substantially cylindrical surfaces of each set is substantially equal to a thickness that the additive manufacturing apparatus can produce with a single tool path.

Then, in stage 3, concentric closed contours that follow the intersections of the substantially cylindrical surfaces and the build layers are generated. For example, a first set of three concentric closed contours 612 is provided for the first set of three substantially cylindrical surfaces 608 for the first line 604, and a second set of three concentric closed contours 614 is provided for the second set of three substantially cylindrical surfaces 610 for the second line 606. Other sets of concentric closed contours are provided but are not referenced in the Figure.

Then, in stage 4, combined closed contours, such as combined closed contours 616, are generated from the non-overlapping parts of corresponding closed contours that overlap.

In this embodiment, the spacing between the closed contours of each set is substantially equal to a thickness that the additive manufacturing apparatus can produce with a single tool path. The closed contours can then be used as tool paths for the build layers. However, in other embodiments, it may be necessary to provide further tool paths within the closed contours.

The method 600 of FIG. 6 accordingly provides a way to generate tool path data from object design data for an object that is represented by lines that represent structures of greater thickness than a thickness of solid material that can be achieved by a particular additive manufacturing apparatus using a single tool path line.

Figure 7:
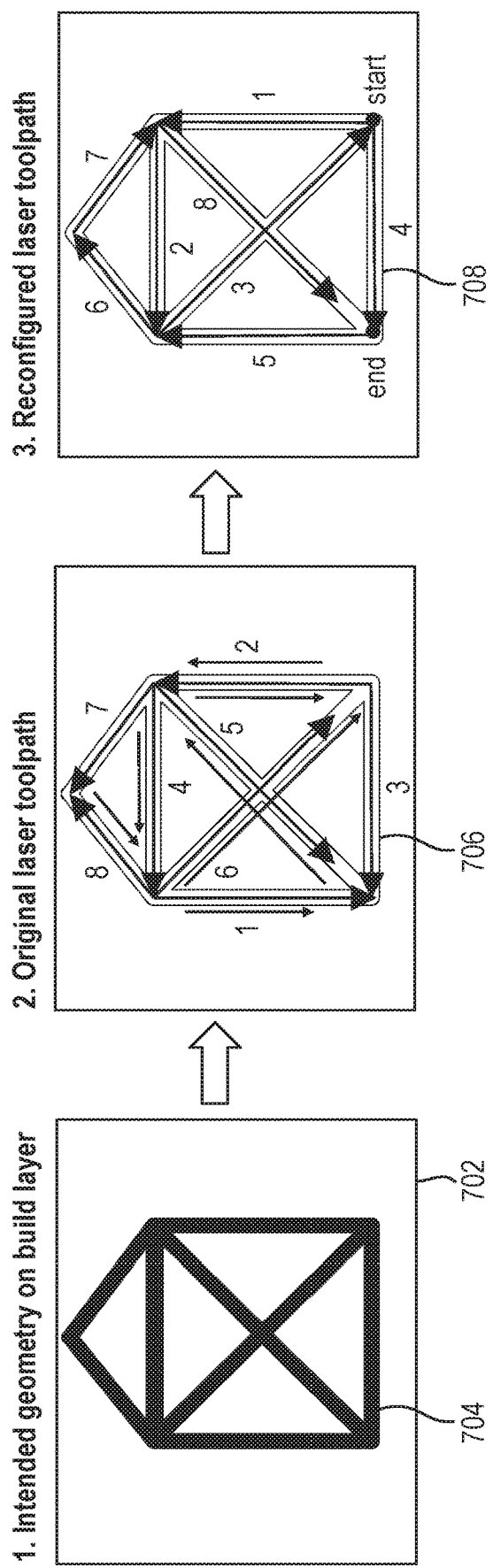
FIG. 7 illustrates a method of generating and reconfiguring tool path data according to embodiments of the present invention.

FIG. 7 illustrates a method of generating and reconfiguring tool path data according to embodiments of the present invention.

The method 700 begins in stage 1, which shows in plan view the lines 704 that represent an object for a particular build layer 702. Then, in stage 2, tool path data 704 comprising eight tool paths is provided for the build layer 702. The tool path order is indicated with the numbers 1-8. With this tool path order, there is significant wasted tool travel from the end of each tool path to the start of the next tool path. Then, in stage 3, the tool path order is automatically reconfigured to reduce the tool path travel. In embodiments, the tool paths can be reconfigured by walking along the tool paths and modifying the tool paths based on a set of heuristics. With this reconfigured tool path order, there is no wasted tool travel from the end of each tool path to the start of the next tool path.

The method of FIG. 7 accordingly provides a way to generate tool path data that can be quicker for the additive manufacturing apparatus to implement when compared with existing additive manufacturing arrangements. In embodiments, manufacturing times that are around 10 times faster have been achieved.

FIG. 8 illustrates another method of generating and reconfiguring tool path data according to embodiments of the present invention.

The method 800 begins in stage 1, which shows in plan view the outer contour 802 of a structural feature of an object for a particular build layer. In stage 1, the contour 802 is filled with tool path points 804 using a statistical distribution based on a 2D Poisson Disk that varies based on the geometry of the contour 802. Then, in stage 2, the tool path tool path points 804 are connected together with a single tool path 806. In other embodiments, plural respective tool paths may be connected together by greedy or cooperative algorithmic agents.

In either case, the tool path points are connected together using a recursive nearest neighbour process in which a first tool path point is connected to a second unconnected tool path point that is determined as being the nearest neighbour to the first tool path point based on a Euclidean distance from the first tool path point to the second tool path point. The second tool path point is then connected to a third unconnected tool path point that is determined as being the nearest neighbour to the second tool path point based on a cost value comprising weighted sum of the Euclidean distance from the second tool path point to the third tool path point and a turning angle between the connection from the second tool path point to the third tool path point and the previous connection from the first tool path point to the second tool path point. The relative weightings for the Euclidean distance and turning angle are selected based on the dynamic movement capabilities of the tool in question, with greater weighting being given to the angle when the tool is harder to redirect in use. This nearest neighbour process is then repeated until all of the tool path points are connected together. In other embodiments, the nearest neighbour may also or instead be selected based on the shortest Dubins path between the tool path points.

Then, in stage 3, the tool path 806 can be reconfigured by spatially sorting the lines and polylines of the tool path using nearest neighbour spatial sorting. In embodiments, the tool path can be reconfigured by walking along the tool path and modifying the tool path based on a set of heuristics. Then, in stage 4, the tool path is further reconfigured by removing overlaps between the lines and polylines of the tool path. With this reconfigured tool path data, there is reduced tool travel and travel time for the tool path data.

The method 800 of FIG. 8 accordingly provides a way to generate tool path data for a closed contour that can be quicker for the additive manufacturing apparatus to implement when compared with existing additive manufacturing arrangements. As discussed above, in embodiments, manufacturing times that are around 10 times faster have been achieved.

Figure 9:
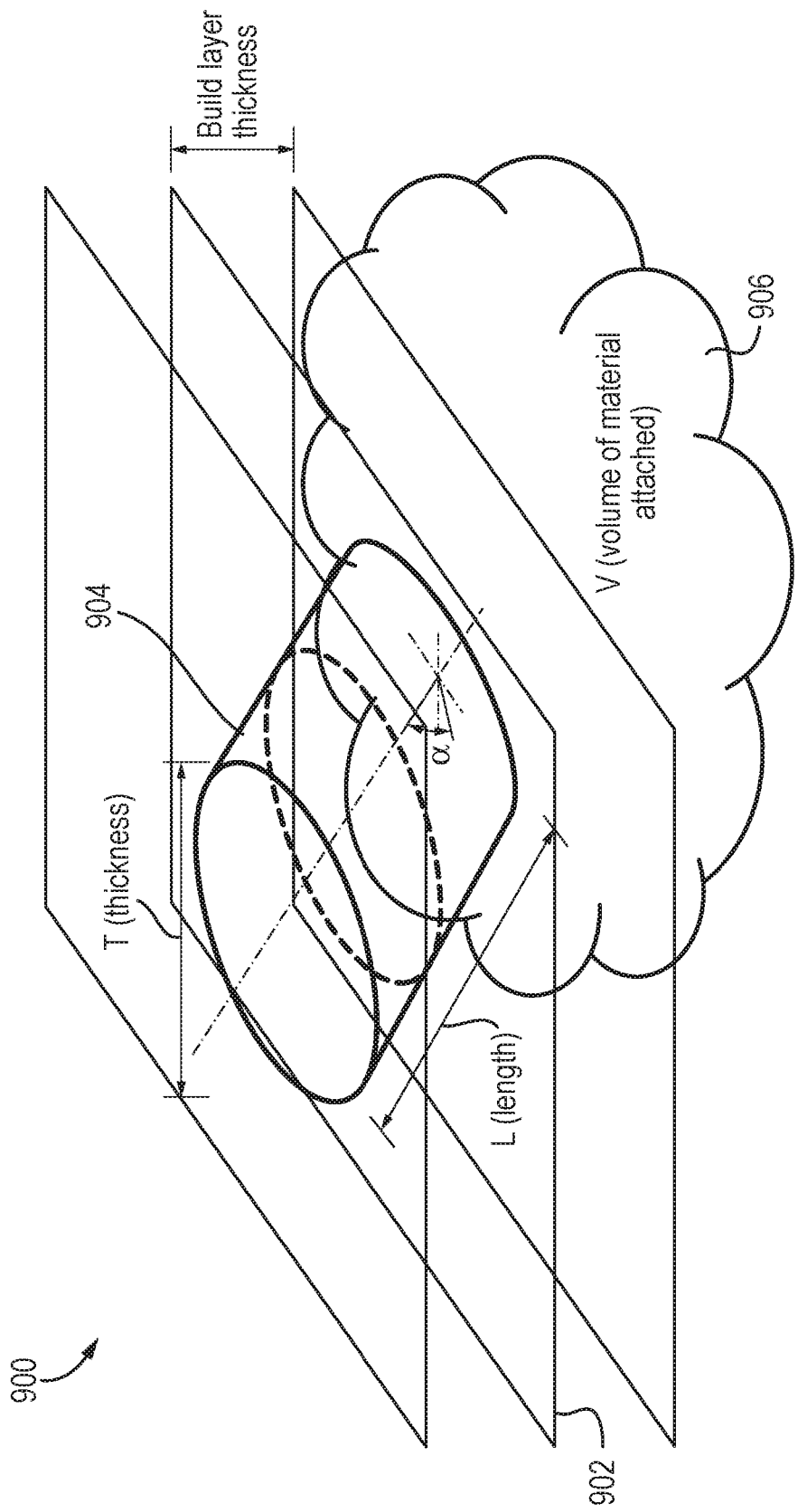
FIG. 9 shows the geometric properties of a structural feature that can be taken into account when generating tool path data according to embodiments of the present invention.

FIG. 9 shows the geometric properties of a structural feature that can be taken into account when generating tool path data according to embodiments of the present invention.

FIG. 9 shows a set of geometric properties 900 for a structural feature 904 of an object. In this embodiment, the structural feature 904 comprises a strut. The geometric properties 900 include the length L of the structural feature 904, the thickness T of the structural feature 904, the angle α that the longitudinal axis of the structural feature 904 makes with the plane of a build layer 902, and the volume V of solidified material 906 that will be adjacent to the structural feature 904. The build layer thickness, or inversely the build layer resolution, and the type of material can also be taken into account.

Figure 10:
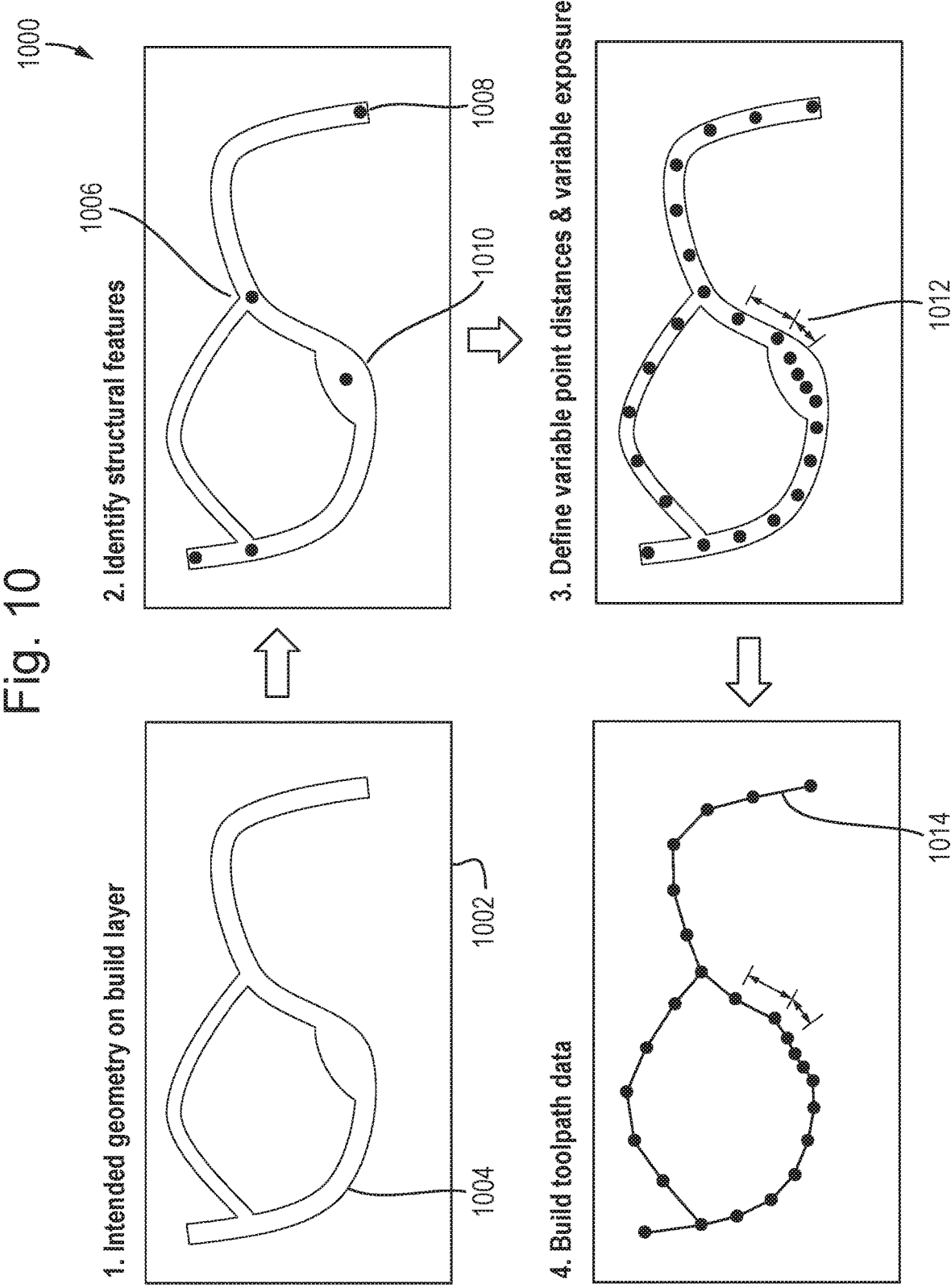
FIG. 10 illustrates a method of generating tool path data based on the geometric properties of a structural feature according to embodiments of the present invention.

FIG. 10 illustrates a method of generating tool path data based on the geometry of a structural feature according to embodiments of the present invention.

The method 1000 begins in stage 1, which shows in plan view the intended geometry 1004 of an object for a particular build layer 1009. Then, in stage 2, structural features are identified. These structural features include an intersection 1006, an end 1008 and a relative thickening 1010. Then, in stage 3, additive manufacturing parameters are selected based on the geometry of the structural features. In this embodiment, the additive manufacturing parameters affect the amount of material solidified along a tool path by setting the amount of energy delivered to the material along a tool path. In particular, in this embodiment, the spatial frequency of the tool path points is increased in the region 1012 of the relative thickening 1010. Then, in stage 4, the tool path based on the geometry of the structural features is generated.

In this embodiment, the spatial frequency is selected using a database that stores spatial frequencies for corresponding thicknesses for the material in question. Other parameters may be selected as desired, such as laser power, laser temporal switching frequency, laser spot size, laser dwell time, laser speed, etc. The selected parameters may also be based on other geometric properties as shown in FIG. 8. For example, in this embodiment, a greater angle to a build layer and a greater adjacent solidified volume would lead to selecting parameters that deliver more solidification energy, since during the build process there will be a greater amount of underlying substantially solid material in the build layer below having greater thermal conductivity.

The method 1000 of FIG. 10 accordingly provides a way to generate tool path data that specifies additive manufacturing parameters that are better suited to the geometry of the structural features of the object. This can allow the additive manufacturing apparatus to implement and produce objects having finer detail and/or superior material and/or structural properties, when compared with existing additive manufacturing arrangements. As discussed above, in embodiments, viable structural feature thickness of <500 microns, and even 100 microns have been achieved.

Various physical objects that can be manufactured using the methods described herein will now be described.

Figure 11:
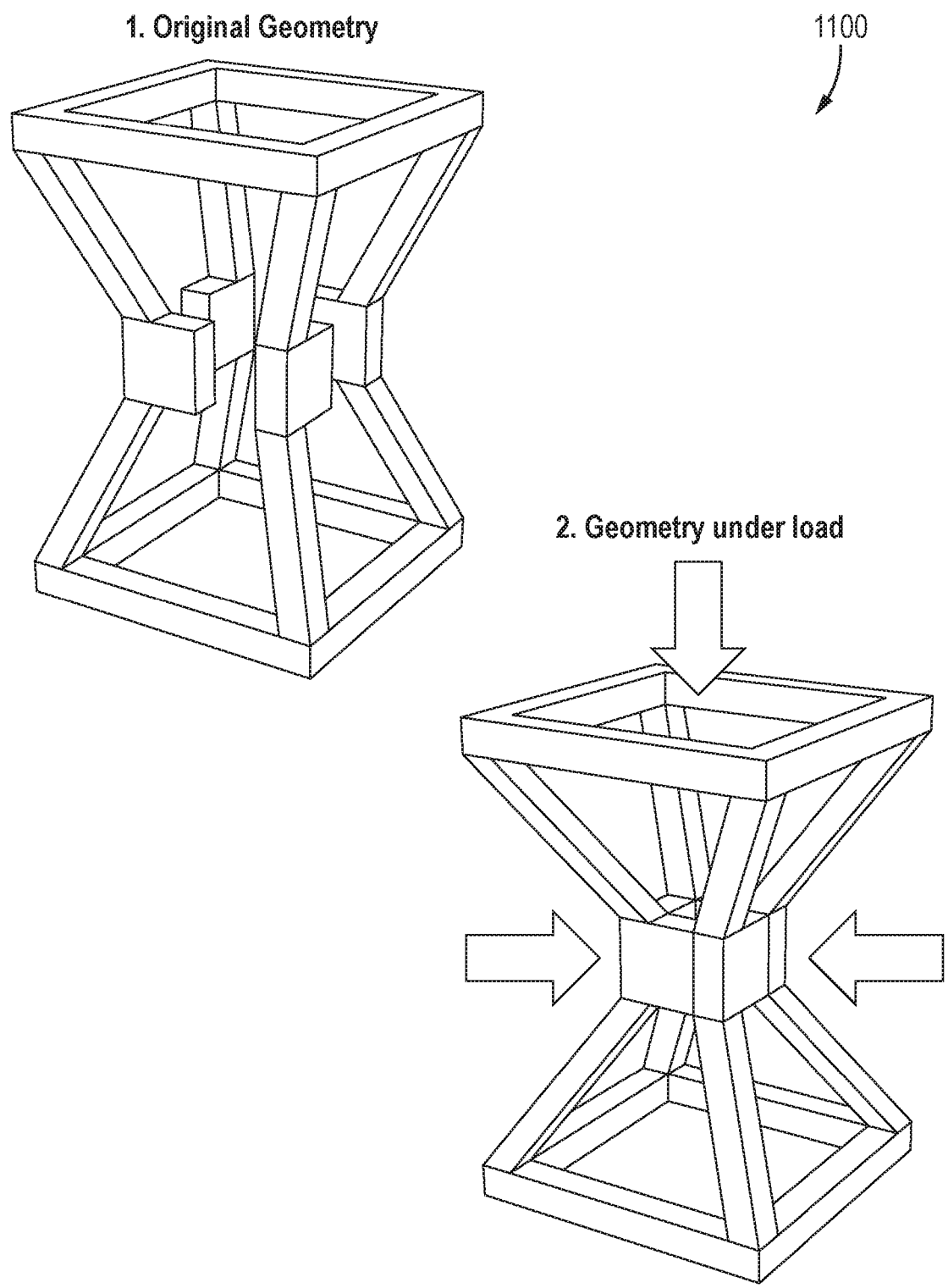
FIG. 11 shows a re-entrant honeycomb structure manufactured using additive manufacturing according to embodiments of the present invention.

FIG. 11 shows a re-entrant honeycomb structure 1100 manufactured using additive manufacturing. The structure 1100 is shown in an unloaded state 1 and a loaded state 2. The structure 1100 initial deforms easily under load and then becomes difficult to deform. The methods described herein make manufacturing such structures 1100 viable using additive manufacturing, even for structures of very small scale. A macro object can comprise an array of many of these structures 1100.

Figure 12:
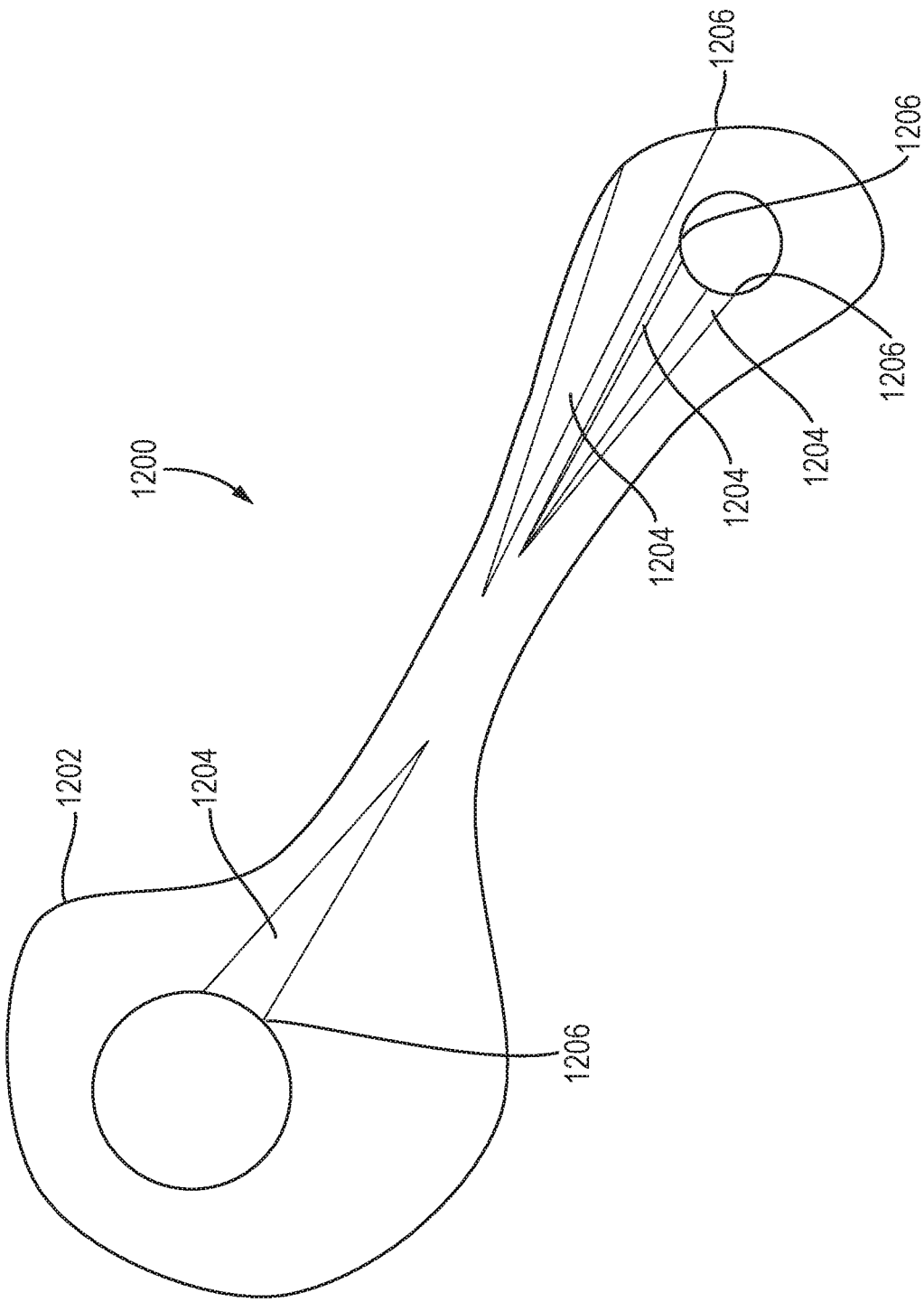
FIG. 12 shows a mechanical linkage manufactured using additive manufacturing according to embodiments of the present invention.

FIG. 12 shows a cross-section through a mechanical linkage 1200 manufactured using additive manufacturing. The mechanical linkage 1200 has an outer surface 1202 and hollow internal channels 1204. The channels 1204 reduce the amount of material and weight of the linkage 1200 without adversely affecting the strength of the linkage 1200. The channels 1204 have openings 1206 that prevent powder retention following additive manufacturing. The methods described herein make manufacturing such a linkage 1200 viable using additive manufacturing, even at large scales of production.

Figure 13:
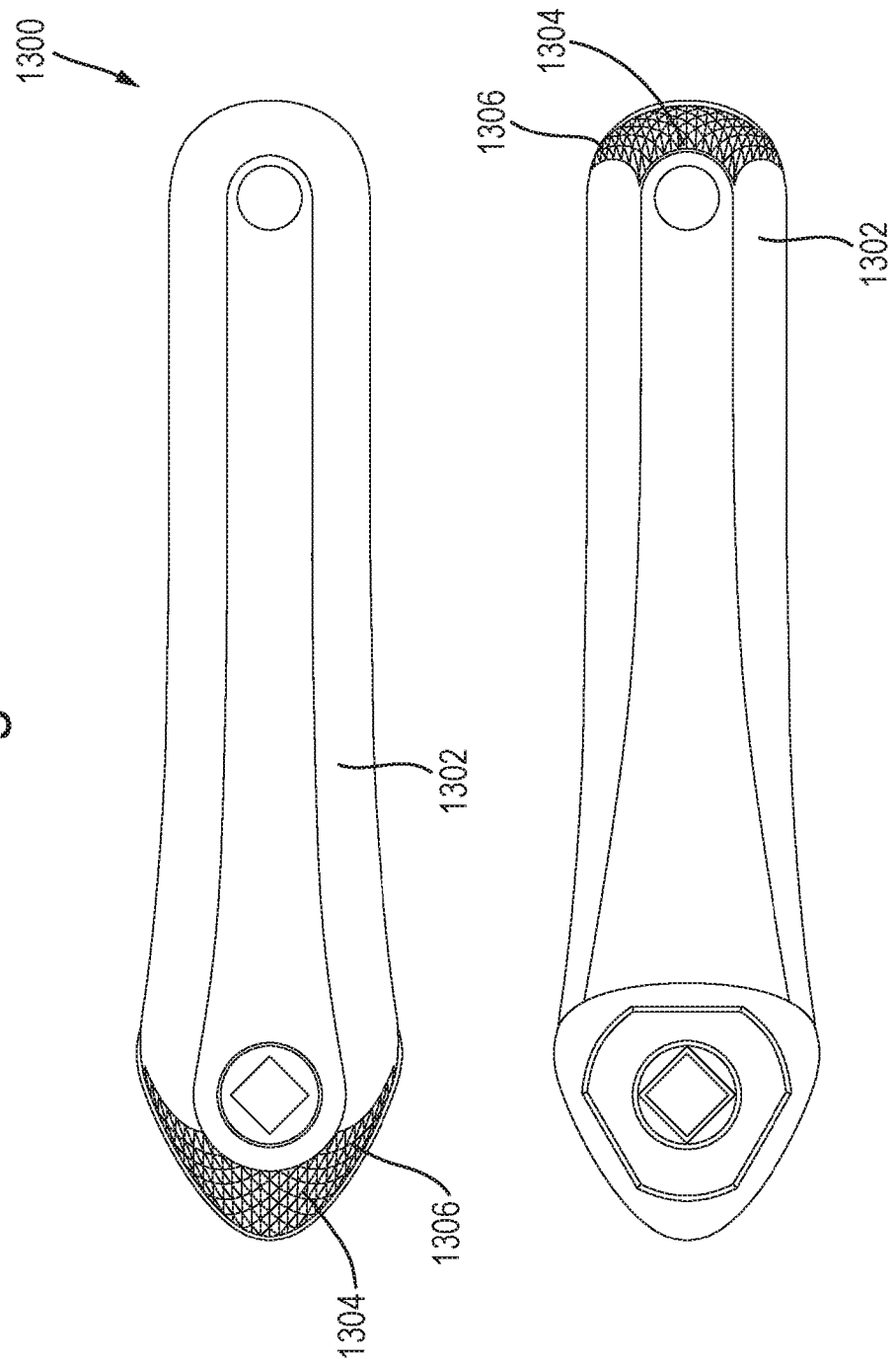
FIG. 13 shows a bike crank manufactured using additive manufacturing according to embodiments of the present invention.

FIG. 13 shows a bike crank 1300 manufactured using additive manufacturing. Plan views from above and below are provided. The bike crank 1300 has an outer surface 1302 and a hollow lattice structure 1304 that supports the outer surface 1302. The hollow lattice structure 1304 reduces the amount of material and weight of the bike crank 1300 without adversely affecting the strength of the bike crank 1300. The channels of the hollow lattice structure 1304 have openings 1306 that prevent powder retention following additive manufacturing. The methods described herein make manufacturing such a bike crank 1300 viable using additive manufacturing, even at large scales of production.

Figure 14:
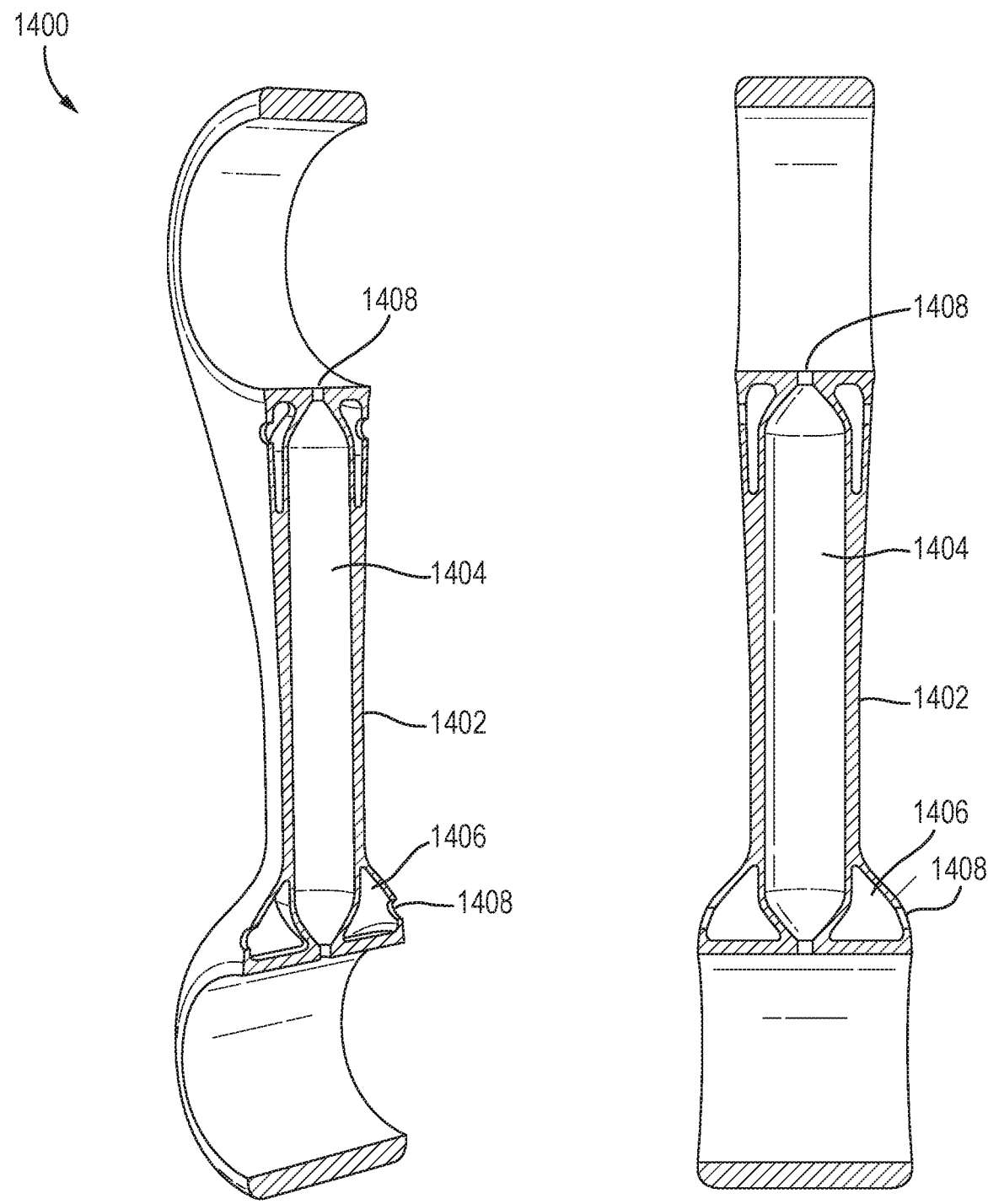
FIG. 14 shows a piston rod manufactured using additive manufacturing according to embodiments of the present invention.

FIG. 14 shows a cross-section through a piston rod 1400 manufactured using additive manufacturing. Two perspective views are provided. The piston rod 1400 has an outer surface 1402, hollow internal channels 1404 and hollow internal chambers 1406. The channels 1404 and chambers 1406 reduce the amount of material and weight of the piston rod 1400 without adversely affecting the strength of the piston rod 1400. The channels 1404 and chambers 1406 have openings 1408 that prevent powder retention following additive manufacturing. The methods described herein make manufacturing such a piston rod 1400 viable using additive manufacturing, even at large scales of production.

Figure 15:
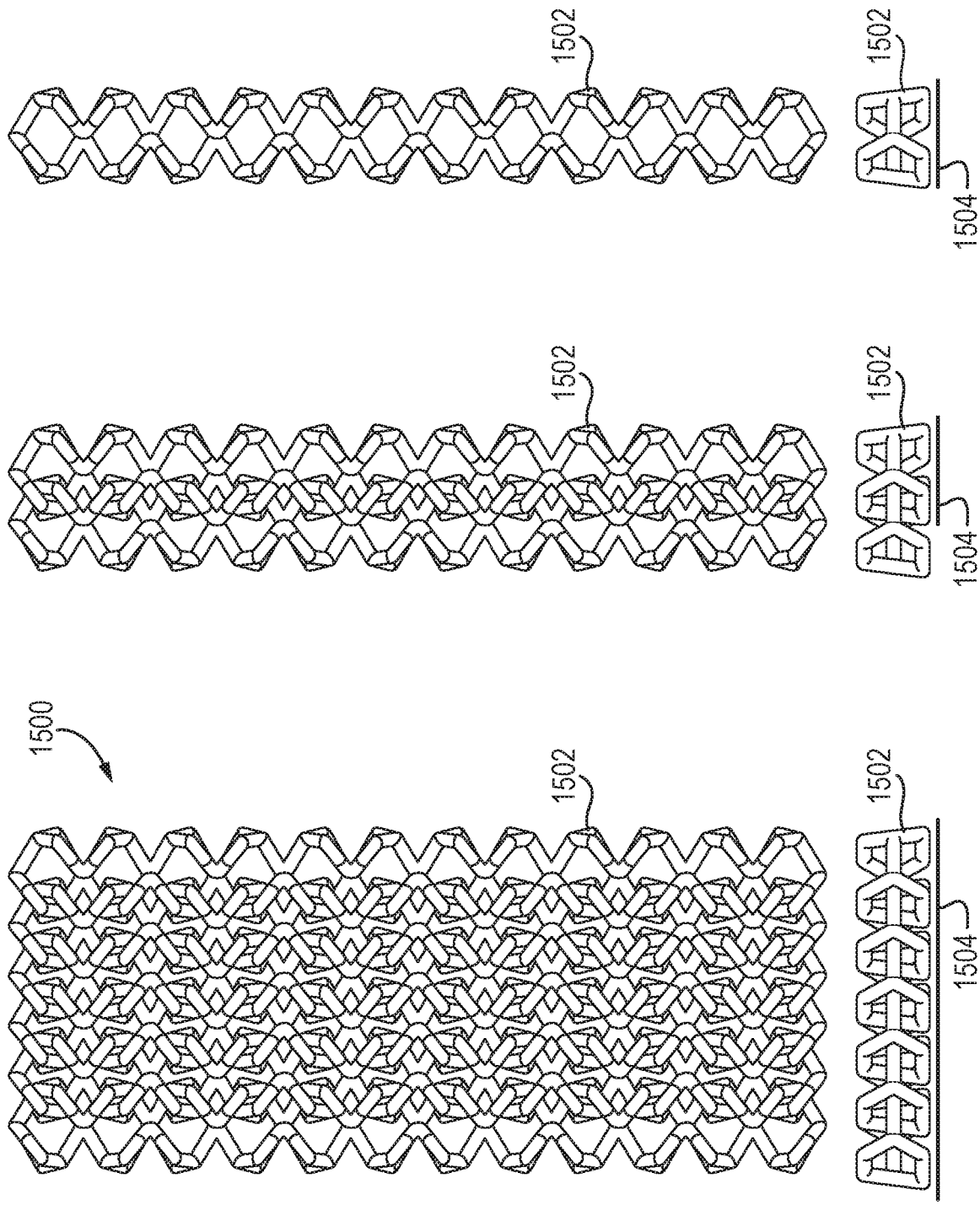
FIG. 15 shows a strap manufactured using additive manufacturing according to embodiments of the present invention.

FIG. 15 shows a flexible strap 1500 manufactured using additive manufacturing. The strap 1500 comprises plural closed loops 1502. The strap 1500 comprises columns of attached closed loops 1502 and rows of interlinked closed loops 1502. The columns of loops 1502 are shown with alternating shading to better show the structure of the strap 1500. Also shown in FIG. 15, to the right of the strap 1500, are two columns of the loops 1502 in isolation and, to the right of that, a single column of the loops 1502 in isolation to better show the structure of the loops 1502. Also shown in FIG. 15, below the strap 1500, is an end view of the strap on a surface 1504, in order to show the self-supporting nature of the loops 1502 during additive manufacture. The methods described herein make manufacturing such an intricate strap 1500 viable using additive manufacturing, even at large scales of production.

Figure 16:
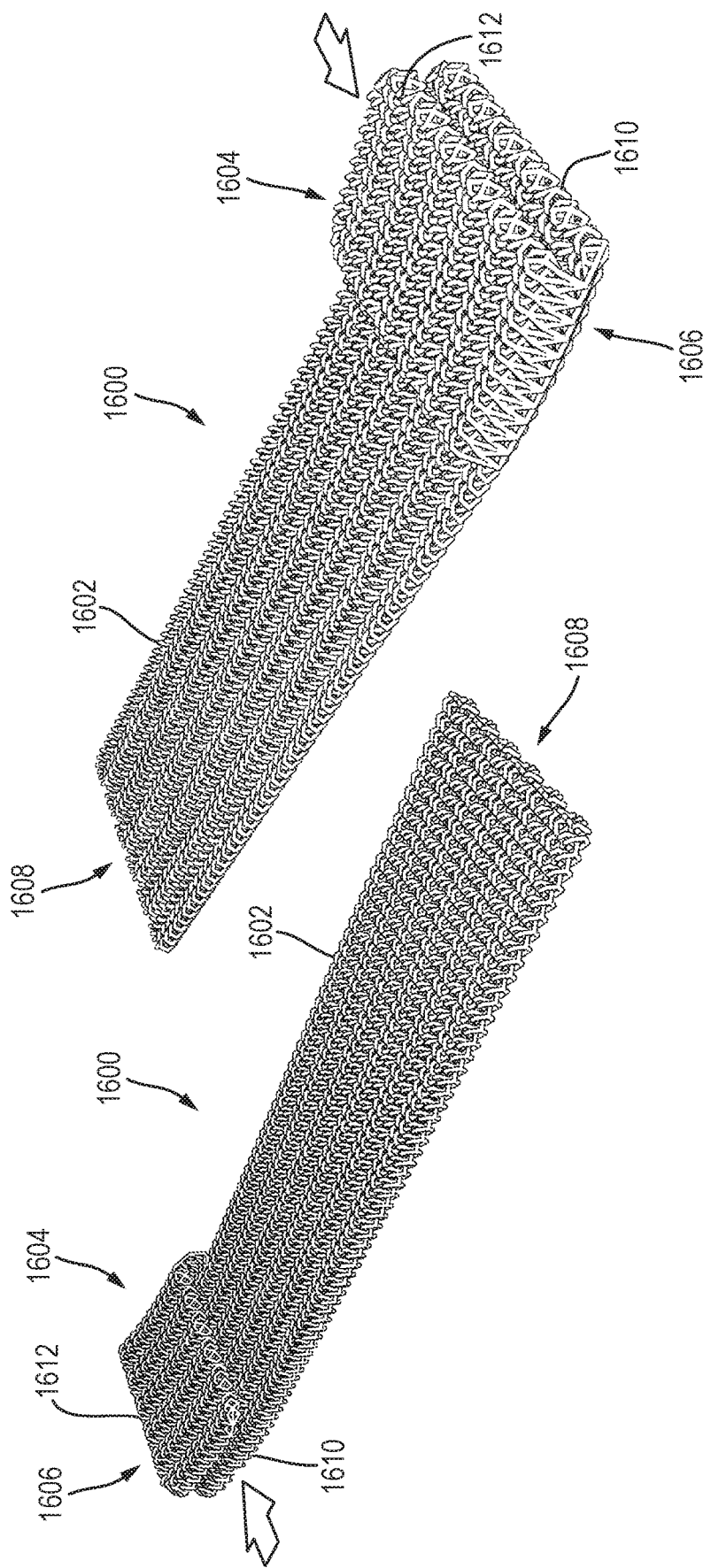
FIG. 16 shows a watch strap manufactured using additive manufacturing according to embodiments of the present invention.

FIG. 16 shows a watch strap 1600 manufactured using additive manufacturing. Two perspective views of the watch strap 1600 are provided. In a similar manner to the strap 1500 of FIG. 15, the watch strap 1600 of FIG. 16 comprises plural closed loops 1602. The watch strap 1600 further comprises a clasp 1604 for fastening the ends of the watch strap 1600 together longitudinally or circumferentially when the watch strap 1600 is worn. The clasp 1604 comprises a first rigid section 1610 and a second rigid section 1612 that are opposed to one another and that form a U-shaped cross section. The clasp 1604 is attached to the first end 1606 of the watch strap 1600 and is removably fastenable to the second end 1606 of the watch strap 1600 by an interference fit when the second end 1606 of the watch strap 1600 is inserted laterally into the clasp 1604 between the first and second sections 1610,1612 as shown by the arrows. The methods described herein make manufacturing such an intricate watch strap 1600 viable using additive manufacturing, even at large scales of production.

Several more specific examples will now be described.

In a first example, a large complex radial filter component was designed using a radially graded bcc lattice. The structure was successfully modelled in a NURBS based CAD modelling environment due to the representation of the structure as lines—something that would have otherwise been impossible in CAD. Tool path data for an EOS M280 laser powder bed fusion based machine was generated using both the established outer contour fill method and a projection method according to an embodiment of the present invention. The exposure tool path travel distance of the part was reduced from 44.3 km to 8.0 km by the use of the projection method leading to a reduction in build time by over 50%. This reduction in production time significantly reduced the cost of the part, therefore enabling economic production.

In another example, samples of a randomised lattice structure (21×13 dia mm) were produced on a Renishaw AM250 using both the established outer contour fill method and a projection method according to an embodiment of the present invention. These samples were then CT scanned to determine base metal porosity of the structure. The projection method was found to improve base metal porosity substantially over the contouring method.

In another example, thin beams were produced using a projection method according to an embodiment of the present invention on a Renishaw AM250. Through modification of parameters it was possible to construct struts at very close to 1:1 of the spot size of the laser, approximately <100 um.

In another example, a stochastic randomised lattice was designed which produces an even distribution of struts in all directions. Using a projection method according to an embodiment of the present invention to generate CAM data, the application of a single set of processing parameters, laser speed and laser power produced struts of varying thickness. This thickness is a result of a relationship between the angle of the strut and the energy delivered to the powder bed. When melting, the energy required is related to not only the characteristics of the powder (its absorptivity and diffusivity and conductivity), but the condition of the material below (Z-axis) and around the powder (X & Y-axis). With struts, the condition of powder can be significantly affected by the condition of the material below the strut and this is driven by the angle of the strut. When the angle of the strut is closer to the build plane, the condition of the material below the strut is largely un-sintered powder. When the strut is close to perpendicular the material below consists of a larger proportion of melted material. Melted material has a considerably higher thermal conductivity than un-sintered powder. Thus, angles perpendicular to the build layer plane can require the delivery of more energy to ensure the layer is melted correctly.

By analysing the angle $\alpha$, length L and layer thickness it is possible to determine empirically the correct laser properties to be applied to achieve a specific thickness. Through empirical testing this method can be used to build a model or database such that by analysing the angle α and length L of a strut, the correct exposure parameters (laser power, laser speed) can be determined in order to achieve a target thickness T.

In another example, a stochastic randomised lattice was designed which produces an even distribution of struts in all directions. The application of a single set of parameters leads to a variation in strut diameters due to uneven angle. Instead these struts are then sorted by angle, length and target thickness and matched to a set of laser and projection parameters. The resulting data enabled the produced structure to maintain its thickness in all elements irrespective of the orientation of the strut.

This additional resolution capability can be important in the production of structures that can be categorised as materials at a particular (macroscopic) scale, as the minimum resolution achievable defines the minimum scale at which said structures act as materials. The ability to render materials within an additive manufacturing process enables the creation of spatially variable bulk material properties. This enables additive manufacturing processes that are capable only of processing a single input material at one time, to produce parts with variations in material properties spatially such as mechanical, thermal, electromagnetic and chemical properties. As an example, this process can be used to create orthopaedic implants that have greater mechanical compliance with surrounding bone, while still being manufactured with established materials such as Cobalt Chrome or Ti6Al4V. In another example, turbine blades of a jet engine made from Inconel can have their centre of mass moved to reduce centripetal forces and improve creep/fatigue resistance. In another example, a skin made of a vehicle constructed from an elastomeric or fabric matrix, can be dynamically modified to change the airflow characteristics over the surface.

It should be noted that both the efficiencies and quality improvements above have been established across a number of systems, including a number of powder bed fusion systems. In particular optimisation of the tool path has in some cases lead to a reduction in tool path time by over 90% in some cases.

Although the present invention has been described with reference to various embodiments, it will be understood by those skilled in the art that various changes in form and detail may be made without departing from the scope of the invention as set forth in the accompanying claims.

The invention claimed is:

1. A method of generating tool path data to be followed by an additive manufacturing apparatus when manufacturing a physical object, the method comprising:
   providing object design data in which an elongate structural feature of the physical object is represented by a line together with a specified thickness for the line;
   discretizing the line to generate a first layer point that lies within a first build layer of the additive manufacturing apparatus and a second layer point that lies within a second build layer of the additive manufacturing apparatus;
   projecting the second layer point to a projected layer point that lies within the first build layer of the additive manufacturing apparatus; and
   connecting the first layer point to the projected layer point to provide tool path data to be followed by the additive manufacturing apparatus when depositing or solidifying material for the first build layer of the additive manufacturing apparatus.

2. A method as claimed in claim 1 comprising, prior to discretizing the line, moving an end node of the line to a build layer of the additive manufacturing apparatus for that end node to generate an end node layer point.

3. A method as claimed in claim 2 wherein the end node layer point is used as the first layer point or the end node layer point is used as the second layer point.

4. A method as claimed in claim 1 wherein discretizing the line comprises determining an intersection layer point at an intersection of the line and a build layer of the additive manufacturing apparatus.

5. A method as claimed in claim 4 wherein the intersection layer point is used as the first layer point or the intersection layer point is used as the second layer point.

6. A method as claimed in claim 1 further comprising manufacturing a physical object, wherein manufacturing the physical object comprises using the additive manufacturing apparatus to implement the tool path data.

7. A method as claimed in claim 1, wherein the line does not form part of at least one of: (i) a volumetric representation which encloses a volume of the physical object; (ii) a net of polygons which encloses the volume of the physical object; and (iii) a STereoLithography (STL) representation of the physical object.

8. A method as claimed in claim 1, wherein generating the tool path data does not comprise generating closed contours for the structural feature that the line represents.

9. A method of generating tool path data to be followed by an additive manufacturing apparatus when manufacturing a physical object, the method comprising:
   providing object design data in which a wall structural feature of the physical object is represented by a surface together with a specified thickness for the surface;
   slicing the surface to generate a first layer line that lies within a first build layer of the additive manufacturing apparatus and a second layer line that lies within a second build layer of the additive manufacturing apparatus;
   projecting the second layer line to a projected layer line that lies within the first build layer of the additive manufacturing apparatus; and
   using the first layer line and projected layer line to provide tool path data to be followed by the additive manufacturing apparatus when depositing or solidifying material for the first build layer of the additive manufacturing apparatus.

10. A method as claimed in claim 9 comprising, prior to slicing the surface, moving an edge node at an edge of the surface to an edge node layer point within a build layer of the additive manufacturing apparatus.

11. A method as claimed in claim 10 wherein the edge node layer point is used as part of the first layer line or second layer line.

12. A method as claimed in claim 9 wherein slicing the surface comprises determining an intersection layer line at an intersection of the surface and a build layer of the additive manufacturing apparatus.

13. A method as claimed in claim 12 wherein the intersection layer line is used as the first layer line or the intersection layer line is used as the second layer line.

14. A method as claimed in claim 9 comprising generating further layer lines between the first layer line and the projected layer line to generate the tool path data for the first build layer or using the first layer line and the projected layer line to generate a closed contour and using the closed contour to provide the tool path data for the first build layer.

15. A method as claimed in claim 9 comprising:
offsetting or thickening the surface to generate a first offset face;
slicing the first offset face to generate a first offset face layer line that lies within the first build layer;
using the first layer line and the first offset face layer line as part of a first closed contour within the first build layer;
offsetting or thickening the surface to generate a second offset face;
slicing the second offset face to generate a second offset face layer line that lies within the second build layer;
using the second layer line and the second offset face layer line as part of a second closed contour within the second build layer;
projecting the second closed contour to a projected closed contour that lies within the first build layer;
generating a first combined closed contour from overlapping parts of the first closed contour and the projected closed contour; and
using the first combined closed contour to provide tool path data for the first build layer.

16. A method as claimed in claim 9 further comprising manufacturing a physical object, wherein manufacturing the physical object comprises using the additive manufacturing apparatus to implement the tool path data.

17. A data processing system for generating tool path data to be followed by an additive manufacturing apparatus when manufacturing a physical object, the system comprising processing circuitry configured to perform a method of generating tool path data, the processing circuitry being configured to:
provide object design data in which an elongate structural feature of the physical object is represented by a line together with a specified thickness for the line;
discretize the line to generate a first layer point that lies within a first build layer of the additive manufacturing apparatus and a second layer point that lies within a second build layer of the additive manufacturing apparatus;
project the second layer point to a projected layer point that lies within the first build layer of the additive manufacturing apparatus; and
connect the first layer point to the projected layer point to provide tool path data to be followed by the additive manufacturing apparatus when depositing or solidifying material for the first build layer of the additive manufacturing apparatus.

18. A data processing system for generating tool path data to be followed by an additive manufacturing apparatus when manufacturing a physical object, the system comprising processing circuitry configured to perform a method of generating tool path data, the processing circuitry being configured to:
provide object design data in which a wall structural feature of the physical object is represented by a surface together with a specified thickness for the surface;
slice the surface to generate a first layer line that lies within a first build layer of the additive manufacturing apparatus and a second layer line that lies within a second build layer of the additive manufacturing apparatus;
project the second layer line to a projected layer line that lies within the first build layer of the additive manufacturing apparatus; and
use the first layer line and projected layer line to provide tool path data to be followed by the additive manufacturing apparatus when depositing or solidifying material for the first build layer of the additive manufacturing apparatus.

* * * * *